United States Patent
Jassal et al.

(10) Patent No.: US 12,414,033 B2
(45) Date of Patent: Sep. 9, 2025

(54) MOBILITY MANAGEMENT IN MULTI-TIER WIRELESS COMMUNICATION NETWORKS

(71) Applicant: HUAWEI TECHNOLOGIES CO., LTD., Guangdong (CN)

(72) Inventors: Aman Jassal, Kanata (CA); Amine Maaref, Kanata (CA); Jianglei Ma, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 17/966,065

(22) Filed: Oct. 14, 2022

(65) Prior Publication Data
US 2023/0029907 A1 Feb. 2, 2023

Related U.S. Application Data

(63) Continuation of application No. PCT/CN2020/122625, filed on Oct. 22, 2020.

(51) Int. Cl.
*H04W 48/08* (2009.01)
*H04W 48/04* (2009.01)
*H04W 88/06* (2009.01)

(52) U.S. Cl.
CPC ........... *H04W 48/04* (2013.01); *H04W 48/08* (2013.01); *H04W 88/06* (2013.01)

(58) Field of Classification Search
CPC ..... H04W 48/04; H04W 48/08; H04W 88/06; H04W 48/12; H04W 84/06; H04W 48/02; H04W 48/10
USPC ........................................................ 455/422.1
See application file for complete search history.

(56) References Cited

U.S. PATENT DOCUMENTS

| | | | |
|---|---|---|---|
| 10,805,850 | B1 | 10/2020 | Benammar et al. |
| 2019/0150080 | A1* | 5/2019 | Davies ............. H04W 28/0252 370/329 |
| 2021/0297147 | A1* | 9/2021 | Qaise ................. H04W 84/06 |

FOREIGN PATENT DOCUMENTS

| | | |
|---|---|---|
| CN | 110536341 A | 12/2019 |
| WO | 2019063108 A1 | 4/2019 |
| WO | 2020098627 A1 | 5/2020 |
| WO | 2020163610 A1 | 8/2020 |

OTHER PUBLICATIONS

Hughes Networks System Ltd et al., "Service continuity between terrestrial network (TN) and non-terrestrial network (NTN)", 3GPP RAN WG2 Meeting #107bis, Chongqing, China, Oct. 14-Oct. 18, 2019, R2-1913791, 4 pages.

* cited by examiner

*Primary Examiner* — Huy C Ho
(74) *Attorney, Agent, or Firm* — Slater Matsil, LLP

(57) ABSTRACT

Mobility management in multi-tier wireless communication networks involves communicating signaling that includes tier activation information for controlling activation of a UE for operation with a network device of a first tier and a network device of a second tier. The multi-tier wireless communication network includes network devices distributed among multiple tiers, and the multiple tiers include a terrestrial tier and a non-terrestrial tier.

20 Claims, 10 Drawing Sheets

MOBILITY MANAGEMENT IN MULTI-TIER WIRELESS COMMUNICATION NETWORKS

CROSS-REFERENCE TO RELATED APPLICATION

The present application is a continuation of PCT/CN2020/122625, entitled "MOBILITY MANAGEMENT IN MULTI-TIER WIRELESS COMMUNICATION NETWORKS" and filed on Oct. 22, 2020, the entire contents of which are incorporated herein by reference.

FIELD

This application relates generally to communications, and in particular to managing User Equipment (UE) mobility in multi-tier wireless communication networks.

BACKGROUND

Current solutions for mobility management procedures in cellular systems are based on measurements of reference signals sent by serving and non-serving cells. Similarly, the current mobility reporting framework is premised around cell-based events, such as one cell becoming stronger than another cell. Such cell-based events are typically based on Reference Signal Received Power (RSRP) measurements, with the premise that cellular links are such that a communication device at only one end of the link, and in particular UEs, are mobile.

According to Third Generation Partnership Project (3GPP) standards for 5th Generation (5G) New Radio (NR), UEs are always expected to measure Synchronization Signal Physical Broadcast Channel (SS/PBCH) blocks from serving and non-serving cells at all times. UEs can optionally be configured to perform mobility measurements on Channel State Information Reference Signal (CSI-RS) for mobility. Either of these measurement configurations involves the UE always having to detect and measure signals transmitted by non-serving neighbor cells, which consumes time and power. Current mobility solutions also have to address problems known as "ping-pong effects" where UEs at the border of two cells keep bouncing between them.

UE measurement-based mobility management may be feasible in conventional cellular networks due to fixed deployments with terrestrial and non-mobile network devices. In such networks, cell quality improves as a UE is moved closer to the cell, and a UE transitions between cells based on cell quality. In general, non-terrestrial network devices tend to have smaller coverage areas, and as a result a UE may struggle to detect changes in cell quality, especially when the UE is moving at a high speed for example. Measurements for serving and non-serving cells can also create a significant burden for UEs in integrated communication networks in which both terrestrial and non-terrestrial network devices are deployed. Applying conventional measurement and reporting procedures to mobility management in an integrated communication network may thus present significant challenges.

SUMMARY

Embodiments of the present disclosure relate to mobility management in multi-tier communication networks, such as 6th Generation (6G) systems. Solutions are provided for handling mobility across multiple tiers of wireless network devices such as base stations, drones, balloons, planes, and satellites. Some embodiments are also intended to maintain user experience at or beyond required or target Key Performance Indicators (KPIs) for a service that is being consumed by a user.

One potential issue related to handling mobility across multiple tiers in a wireless network is that a UE with limited processing capability cannot be expected to always monitor radio links on multiple tiers, which may include at least a terrestrial network tier and a non-terrestrial network tier, all at once. The non-terrestrial network tier(s) may include network devices based on drones, balloons, planes, and/or satellites, for example. Such monitoring by a UE would consume significant time, and also place a significant demand on limited battery power. In order to facilitate mobility in multi-tier wireless communication networks, UEs may be instructed to detect and measure only certain physical layer links, during certain time periods for example, by activating and/or deactivating mobility measurements on particular mobility reference signals, for example.

Activation of a UE for operation with network devices of different tiers may be controlled using dynamic mobility signaling in some embodiments. Controlling activation of a UE may involve switching, transitioning, or transferring the UE from one tier to another, using dynamic mobility signaling for activating the UE for operation with a network device of one tier and deactivating the UE for operation with a network device of another tier, for example. This may allow a UE to be transitioned from one tier to another without any physical layer control/data transmission, for example, to provide an interruption-free user experience. Although a UE may transition between tiers and operate with network devices in only one tier at a time in some embodiments, other embodiments may involve controlling activation of a UE such that the UE operates with network devices in multiple tiers at a time.

One aspect of the present disclosure relates to a method that involves communicating signaling in a multi-tier wireless communication network that includes network devices distributed among multiple tiers. The signaling includes tier activation information for controlling activation of a UE for operation with a network device of a first tier of the multiple tiers and a network device of a second tier of the multiple tiers. The multiple tiers include a terrestrial tier and a non-terrestrial tier.

According to another aspect of the present disclosure, an apparatus includes a communication interface; a processor, coupled to the communication interface; and a non-transitory computer readable storage medium, coupled to the processor, storing programming for execution by the processor. The programming including instructions to, or to cause the processor to, communicate signaling in a multi-tier wireless communication network that includes network devices distributed among multiple tiers. The tiers include a terrestrial tier and a non-terrestrial tier. The signaling includes tier activation information for controlling activation of a UE for operation with a network device of a first tier and a network device of a second tier.

A computer program product is also disclosed, and includes a non-transitory computer readable storage medium storing programming. The programming includes instructions to, or to cause the processor to, communicate signaling in a multi-tier wireless communication network. The signaling includes tier activation information for controlling activation of a UE for operation with a network device of a first tier and a network device of a second tier of the multi-tier wireless communication network. The multi-tier wireless communication network includes network devices distributed among multiple tiers, and the tiers include a terrestrial tier and a non-terrestrial tier.

Optionally, in any of the previous examples, controlling activation comprises one or both of: activating the UE for operation with the network device of the second tier; and deactivating the UE for operation with the network device of the first tier.

Optionally, in any of the previous examples, the tier activation information comprises one or both of: a command for activating the UE for operation with the network device of the second tier; and a command for deactivating the UE for operation with the network device of the first tier.

Optionally, in any of the previous examples, the tier activation information comprises a command for activating the UE for operation with the network device of the second tier and deactivating the UE for operation with the network device of the first tier.

Optionally, in any of the previous examples, controlling activation comprises changing operation of the UE between operation with the network device of the first tier and operation with the network device of the second tier.

Optionally, in any of the previous examples, operation of the UE with the network device of the first tier comprises detecting, measuring and reporting associated with reference signals for mobility received from the network device of the first tier, and operation of the UE with the network device of the second tier comprises detecting, measuring and reporting associated with reference signals for mobility received from the network device of the second tier.

Optionally, in any of the previous examples, operation of the UE with the network device of the first tier comprises communicating one or both of control and data with the network device of the first tier, and operation of the UE with the network device of the second tier comprises communicating one or both of control and data with the network device of the second tier.

Optionally, in any of the previous examples, the method further includes: determining whether activation of the UE for operation with the network device of the first tier or the network device of the second tier is to be changed. The communicating comprises transmitting the signaling to the UE responsive to determining that activation of the UE for operation with the network device of the first tier or the network device of the second tier is to be changed.

Optionally, in any of the previous examples, the determining comprises determining based on one or more of the following criteria: velocity of the UE relative to one or more network devices of the first tier; velocity of the UE relative to one or more network devices of the second tier; Doppler shift associated with one or more network devices of the first tier; Doppler shift associated with one or more network devices of the second tier; loading of one or more network devices of the first tier; loading of one or more network devices of the second tier.

Optionally, in any of the previous examples, the communicating comprises the UE receiving the signaling, the method further comprising one or more of: activating the UE for operation with the network device of the second tier responsive to receiving the signaling; deactivating the UE for operation with the network device of the first tier responsive to receiving the signaling; changing operation of the UE between operation with the network device of the first tier and operation with the network device of the second tier responsive to receiving the signaling.

Optionally, in any of the previous examples, the tier activation information comprises information that is indicative of one or more communication resources, the one or more communication resources comprising a communication resource that is to be monitored by the UE, a communication resource that is not to be monitored by the UE, or both a communication resource that is to be monitored by the UE and a communication resource that is not to be monitored by the UE.

Optionally, in any of the previous examples, the tier activation information comprises information that is indicative of one or both of the first tier and the second tier.

Optionally, in any of the previous examples, the signaling comprises Mobility Control Information (MCI).

Optionally, in any of the previous examples, the signaling comprises Downlink Control Information (DCI).

Optionally, in any of the previous examples, the signaling comprises Medium Access Control (MAC) signaling.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

The present disclosure relates, in part, multi-tier wireless communication networks that integrate terrestrial and non-terrestrial network devices or systems. Such integration may exploit non-terrestrial network devices to enhance wireless communications that might otherwise be available in a fully terrestrial communication network. Non-terrestrial communication systems include network devices that are not ground-based, and can be used, for example, to provide wireless access to areas that are difficult to service or prohibitively expensive for the number of users that may be served at any given time using terrestrial communication systems, or possibly to provide temporary additional capacity for terrestrial communication systems for a period of time.

Figure 1:
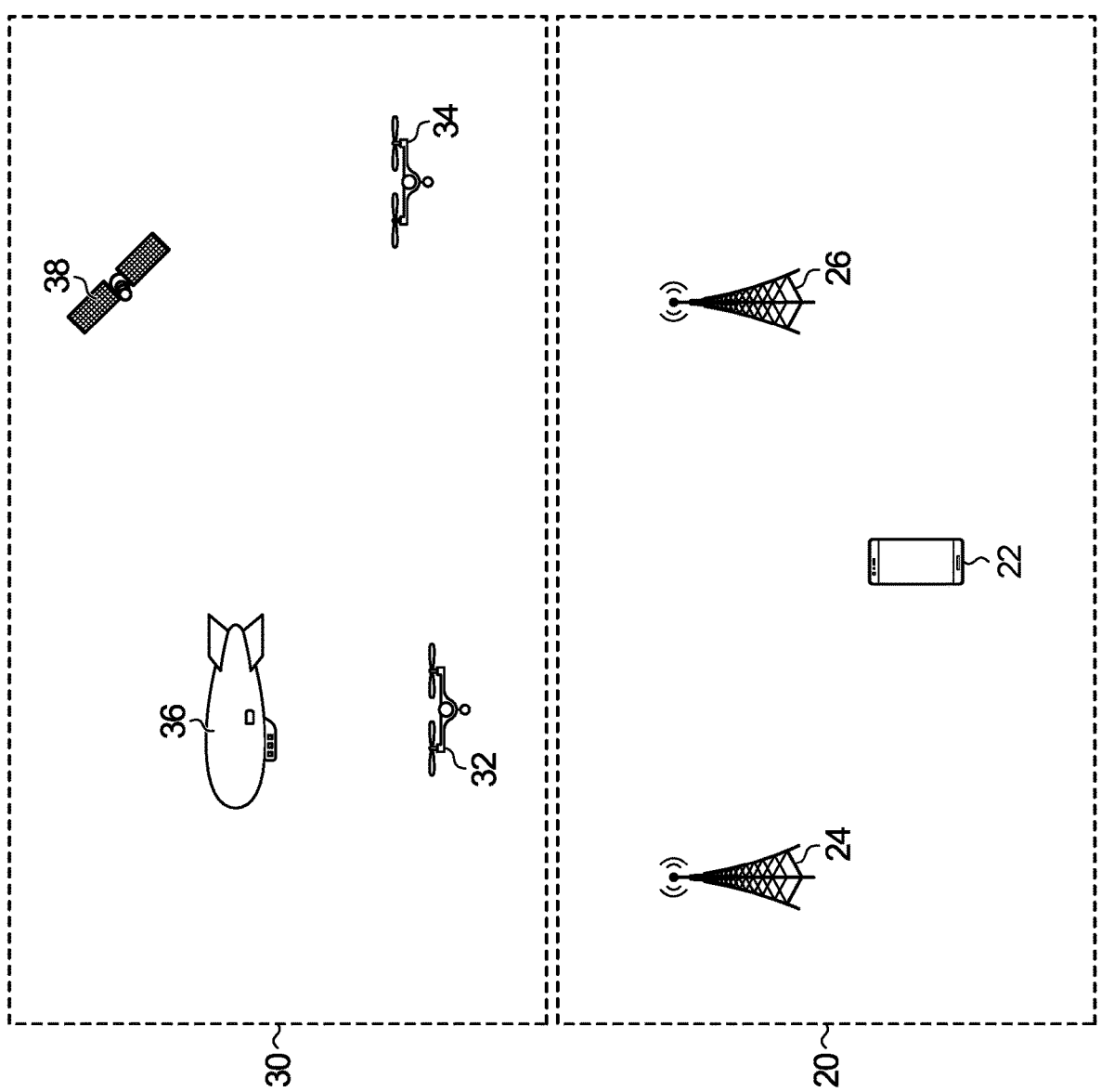
FIG. 1 is a block diagram illustrating an example communication network that integrates terrestrial and non-terrestrial network devices.

FIG. 1 is a block diagram illustrating an example communication network that integrates terrestrial and non-terrestrial network devices. The example communication network 10 includes both a terrestrial communication network or system 20 and a non-terrestrial communication network or system 30. The terrestrial communication network 20 and the non-terrestrial communication network 30 could be considered sub-networks or sub-systems of the communication network 10. As shown, the terrestrial communication network 20 includes multiple terrestrial network devices 24, 26, and the non-terrestrial communication network 30 includes multiple non-terrestrial network devices 32, 34, 36, 38.

Examples of a terrestrial network device 24, 26 include Transmit-Receive Points (TRPs), base stations, and other types of network nodes that are ground-based. A terrestrial network device is bound to the ground. For example, a terrestrial network device may be mounted on or in a building or tower. A terrestrial communication network or terrestrial network device may also be referred to as a land-based or ground-based, and can also or instead include networks or devices that are implemented on or in water.

Non-terrestrial network devices such as those shown at 32, 34, 36, 38 may also include TRPs or other types of network nodes, and may be similar to terrestrial network devices in structure and function but with the exception that non-terrestrial network devices are not ground-based. Examples of non-terrestrial network device include network devices that are carried by or otherwise implemented in drones as shown at 32, 34, balloons as shown at 36, planes or other aircraft, and satellites as shown at 38.

Terrestrial network devices are described primarily by way of example herein as terrestrial TRPs or T-TRPs, and similarly non-terrestrial network devices are described primarily by way of example herein as non-terrestrial TRPs or NT-TRPs. Features disclosed herein in the context of a T-TRP or an NT-TRP are also applicable more generally to other types of terrestrial and non-terrestrial network devices, respectively.

FIG. 1 also illustrates a UE 22. Although the UE 22 is a terrestrial UE in the terrestrial communication network 20 in the example shown, this is intended to be a non-limiting example. An integrated communication network may also or instead provide communication services to non-terrestrial UEs.

Mobility management in accordance with current procedures may involve the UE 22 performing mobility measurements based on reference signals received from any or all of the network devices 24, 26, 32, 34, 36, 38, which can be both time-intensive and power-intensive. A communication network typically includes many more than the six network devices 24, 26, 32, 34, 36, 38 shown in FIG. 1, and accordingly conventional mobility management procedures can represent a significant burden on limited UE power and processing resources.

In a multi-tier communication network, network devices are distributed among multiple tiers. Each network device may be associated with a particular network tier by configuration, for example, and any of various criteria may be used to determine how network devices are to be distributed among the network tiers. Tiers may also or instead be referred to as layers, levels, partitions, or by some other name. Similarly, the concept of network devices being distributed among network tiers may also or instead be expressed as the network devices being segregated or separated into, arranged in, assigned or allocated to, configured for operation at or in, or otherwise associated with, the network tiers. As used herein, tiers and distribution of network devices among tiers are intended to be general terms that encompass these concepts regardless of specific terminology that may otherwise be used.

As an example, the communication network 10 may be considered a two-tier communication network, with a terrestrial network tier that includes the network devices 24, 26 and a non-terrestrial tier that includes the network devices 32, 34, 36, 38. More generally, a multi-tier wireless communication network includes two or more tiers.

Figure 2:
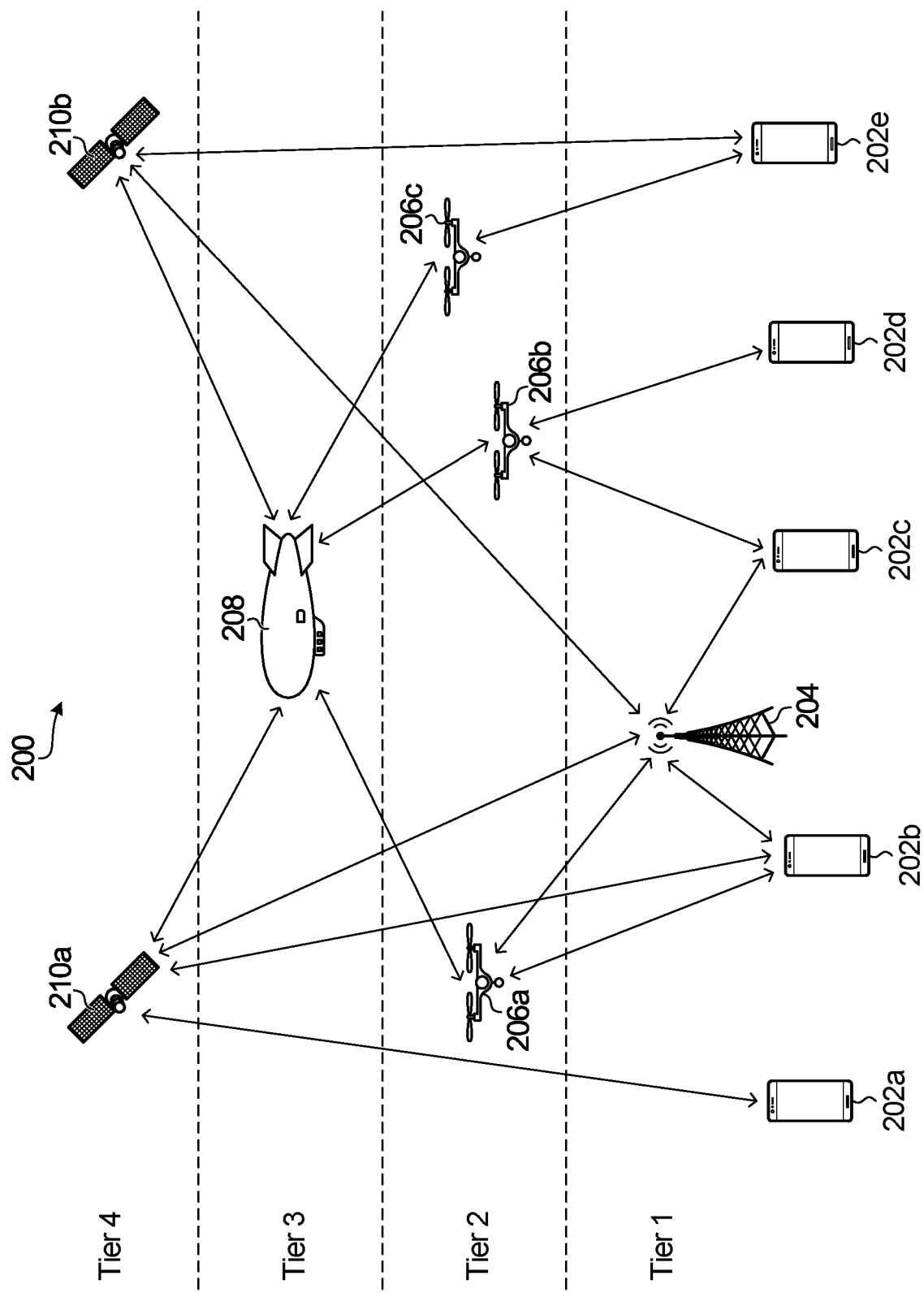
FIG. 2 is a block diagram illustrating another example communication network.

FIG. 2 is a block diagram illustrating another example communication network 200, with four tiers. Although the tiers are labelled as Tier 1, Tier 2, Tier 3, and Tier 4 in FIG. 2, other tier identifiers may also or instead be used.

In the communication network 200, each tier includes one or more network devices of a respective different type. Tier 1 includes a terrestrial network device 204; Tier 2 includes drone-based network devices 206a, 206b, 206c; Tier 3 includes a balloon-based network device 208; and Tier 4 includes satellite-based network devices 210a, 210b. This is illustrative of delineation or determination of tiers based on network device type. Terrestrial TRPs and non-terrestrial TRPs in this example may be considered to be in different network tiers. For network device type-based tier delineation, terrestrial TRPs and non-terrestrial TRPs may also or instead be considered different types of TRPs or different TRP categories, and mobility management as disclosed herein may therefore be considered a form of managing UE mobility between different types or categories of network devices.

The tiers in FIG. 2 are also illustrative of tier delineation or determination based on altitude, or height above the earth's surface, at which a network device is intended to operate. A flying TRP could be implemented at high, medium or low altitude. For example, the operational altitude of an airborne platform TRP or a balloon TRP such as 208 could be between 8 and 50 km; the operational altitude of drone-based TRP such as 206a, 206b, 206c could be between several meters and several kilometers, such as 5 km; and a satellite-based TRP such as 210a, 210b could be operated in a low earth orbit, a very low earth orbit, a medium earth orbit, a high earth orbit or a geosynchronous earth orbit.

A UE 202a, 202b, 202c, 202d, 202e may be able to operate in conjunction with any network device of any tier, and UE-network device connections are illustrated in FIG. 2 by way of example. Any of various criteria may be used to determine or control how a UE operates within a multi-tier wireless communication network, as disclosed herein. Network devices of different tiers may also communicate with each other, and this is also shown by way of example as connections in FIG. 2. Therefore, it should be appreciated that tiers are not necessarily sequential or hierarchical in the sense that a network device of any tier is restricted to communications only with network devices of adjacent tiers, or that a UE may transition only between network devices at adjacent tiers. For example, FIG. 2 illustrates connections between the Tier 1 network device 204 and network devices of Tier 2 and Tier 4.

Figure 3:
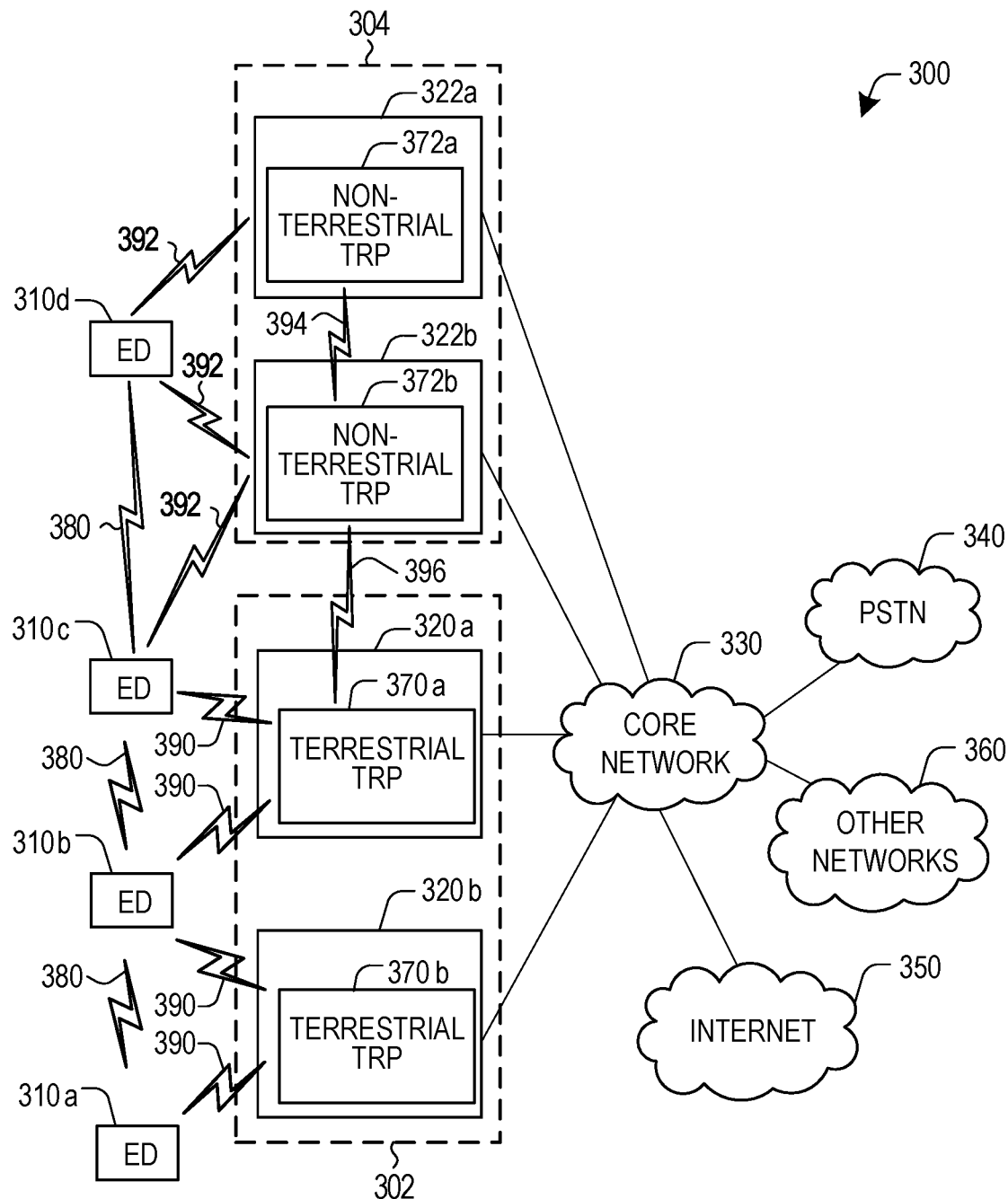
FIG. 3 illustrates an example communication system in which aspects of the present disclosure are implemented in some embodiments.

With reference now to FIG. 3, an example communication system 300 in which aspects of the present disclosure are implemented in some embodiments is shown. In general, the system 300 enables multiple wireless or wired elements to communicate data and/or other content. The purpose of the system 300 may be to provide content (such as any one or more of voice, data, video, text, referred to collectively herein as "data") via broadcast, unicast, multicast, user device to user device, etc. The system 300 may operate efficiently by sharing communication resources such as bandwidth.

In this example, the communication system 300 includes electronic devices (EDs) 310a-310d, Radio Access Networks (RANs) 320a-320b and 322a-322b, a core network 330, a Public Switched Telephone Network (PSTN) 340, the Internet 350, and other networks 360. Although certain numbers of these components or elements are shown in FIG. 3, any reasonable number of these components or elements may be included in the system 300.

The EDs 310a-310d are configured to operate, communicate, or both, in the system 300. For example, the EDs 310a-310d are configured to transmit, receive, or both via wireless communication channels or connections. Each ED 310a-310d represents any suitable end user device for wireless operation and may include such devices (or may be referred to) as a UE/device, wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, smart vehicle, or consumer electronics device. In some implementations, any or all of the EDs 310a-310d are terrestrial or non-terrestrial UEs.

In FIG. 3, the RANs 320a-320b include T-TRPs 370a-370b, respectively, and provide a terrestrial communication network or sub-network 302. Each T-TRP 370a-370b is configured to wirelessly interface with one or more of the EDs 310a-310d to enable access to any other T-TRP 370a-370b, the core network 330, the PSTN 340, the internet 350, and/or the other networks 360. The T-TRPs 370a-370b may be or include one or more of several devices, such as a base station, a base transceiver station (BTS), a Node-B (NodeB), an evolved NodeB (eNodeB), a Home eNodeB, a gNodeB, a site controller, an access point (AP), or a wireless router.

Any ED 310a-310d may be alternatively or additionally configured to interface, access, or communicate with any other T-TRP 370a-370b, the internet 350, the core network 330, the PSTN 340, the other networks 360, or any combination thereof. The communication system 300 may include RANs, such as RAN 320b, wherein the corresponding T-TRP 370b accesses the internet 350 via the core network 330.

The RANs 322a-322b include NT-TRPs 372a-372b, respectively, and provide a terrestrial communication network or sub-network 304. Each NT-TRP 372a-372b is configured to wirelessly interface with one or more of the EDs 310a-310d. Through an NT-TRP 372a-372b, one or more of the EDs 310a-110d may have access to, or be in communication with, any other of the EDs 310a-310d, any RAN 320a-320b, any terrestrial TRP 370a-370b, the core network 330, the PSTN 340, the internet 350, and/or the other networks 360. For example, the NT-TRPs 372a-372b may function similarly to one or more of: a BTS, a NodeB, an evolved eNodeB, a Home eNodeB, a gNodeB, a site controller, an AP, or a wireless router.

The EDs 310a-310d and the TRPs 370a-370b, 372a-372b are examples of communication equipment that can be configured to implement some or all of the functionality or embodiments described herein. In the embodiment shown in FIG. 3, each TRP 370a, 370b, 372a, 372b forms part of a respective RAN 320a, 320b, 322a, 322b, which may include other TRPs, base stations, Base Station Controller(s) (BSC), Radio Network Controller(s) (RNC), relay nodes, elements, and/or devices. Any TRP 370a, 370b, 372a, 372b may be a single element, as shown, or multiple elements, distributed in the corresponding RAN, or otherwise. Each TRP 370a, 370b, 372a, 372b may be configured to operate to transmit and/or receive wireless signals within a particular geographic region or area, sometimes referred to as a coverage area or cell. A cell may be further divided into cell sectors, and a TRP 370a, 370b, 372a, 372b may, for example, employ multiple transceivers to provide service to multiple sectors. In some embodiments a TRP 370a, 370b, 372a, 372b may be implemented as pico or femto nodes where the radio access technology supports such nodes. In some embodiments, Multiple-Input Multiple-Output (MIMO) technology may be employed having multiple transceivers for each coverage area.

The number of RANs 320a-320b, 322a-322b shown is one example only. Any number of RANs may be contemplated when devising the system 300.

In the example shown, the T-TRPs 370a, 370b communicate with one or more of the EDs 310a-310c over one or more air interfaces 390 using wireless communication links, such as Radio Frequency (RF), microwave, infrared (IR), etc. Communications with the ED 310d may also be supported, but have not been shown in FIG. 3 in order to avoid further congestion in the drawing. The air interfaces 390 may utilize any suitable radio access technology. For example, the system 300 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 390.

A T-TRP 370a-370b may implement Universal Mobile Telecommunication System (UMTS) Terrestrial Radio Access (UTRA) to establish an air interface 390 using Wideband CDMA (WCDMA). In doing so, a T-TRP 370a-370b may implement protocols such as HSPA, HSPA+ optionally including HSDPA, HSUPA or both. Alternatively, a T-TRP 370a-370b may establish an air interface 390 with Evolved UTMS Terrestrial Radio Access (E-UTRA) using LTE, LTE-A, and/or LTE-B. It is contemplated that the system 300 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The example in FIG. 3 also illustrates that the NT-TRPs 372a-372b communicate with one or more of the EDs 310b-310d over one or more air interfaces 392 using wireless communication links, such as RF, microwave, IR, etc. Communications with the ED 310a may also be supported, but have not been shown in FIG. 3 in order to avoid further congestion in the drawing. The air interfaces 392 may utilize any suitable radio access technology. For example, the communication system 300 may implement one or more orthogonal or non-orthogonal channel access methods, such as CDMA, TDMA, FDMA, OFDMA, or SC-FDMA in the air interfaces 392.

An NT-TRP 372a-372b may implement UTRA to establish a wireless link over an air interface 392 using WCDMA. In doing so, the NT-TRPs 372a-372b may implement protocols such as HSPA, HSPA+ optionally including HSDPA, HSUPA or both. Alternatively, an NT-TRP 372a-372b may establish the wireless link over the air interface 392 with E-UTRA using LTE, LTE-A, LTE-B, 5G NR and/or 6G. As noted above, other radio technologies for implementing wireless links include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized. The air interfaces 392 may be substantially similar to the air interfaces 390, or they may be substantially different.

The NT-TRPs 372a-372b communicate with each other over a wireless link 394, and the NT-TRP 372b communicates with the T-TRP 370a over a wireless link 396. Other inter-TRP communications may also be supported, but have not been illustrated in FIG. 3 in order to avoid further congestion in the drawing.

The wireless links 394, 396 may be substantially similar to other wireless links, such as those over the air interfaces 390 and/or 392, or they may be substantially different.

The RANs 320a-320b, 322a-322b are in communication with the core network 330 to provide the EDs 310a-310d with various services such as voice, data, and other services. Understandably, the RANs 320a-320b, 322a-322b and/or the core network 330 may be in direct or indirect communication with one or more other RANs (not shown), which may or may not be directly served by core network 330, and may or may not employ the same radio access technology as any one or more of the RANs 320a-320b, 322a-322b. The core network 330 may also serve as a gateway access between (i) the RANs 320a-320b, 322a-322b or EDs 310a-310d or both, and (ii) other networks (such as the PSTN 340, the Internet 350, and the other networks 360). In addition, some or all of the EDs 310a-310d may include functionality for communicating with different wireless networks over different wireless links using different wireless technologies and/or protocols. PSTN 340 may include circuit switched telephone networks for providing Plain Old Telephone Service (POTS). Internet 350 may include a network of computers and subnets (intranets) or both, and incorporate protocols, such as IP, TCP, UDP. EDs 310a-310d may be multimode devices capable of operation according to multiple radio access technologies, and incorporate multiple transceivers necessary to support such technologies.

Direct communications between the EDs 310a-310d are also possible, and direct communication links 380 between the EDs are shown in FIG. 3. As an example of direct ED-ED communications, UEs may communicate directly with each other over sidelinks.

Several examples of multi-tier wireless communication networks are provided above. Embodiments disclosed herein relate to mobility management in such networks. Tiers in a multi-tier wireless communication network may be delineated in any of various ways, but embodiments of the present disclosure are more particularly targeted to network deployments in which at least one tier includes non-terrestrial network devices such as NT-TRPs.

RSRP-based mobility measurements may be feasible in conventional cellular networks due to fixed deployments with terrestrial and non-mobile network devices. In such networks, cell quality improves as a UE is moved closer to the cell. In general, non-terrestrial network devices such as NT-TRPs tend to have smaller coverage areas, and as a result a UE may struggle to detect changes in cell quality, especially when the UE is moving at a high speed for example.

According to embodiments disclosed herein, user experience is improved by activating a UE for operation with, and potentially offloading a UE to, a different tier. Such parameters as any one or more of experienced data rate, service targets, or service requirements may be used in determining when a UE is to be activated for operation with a different tier or offloaded from one tier to a different tier. For example, if user experience deteriorates because its actual data rate drops, UE speed increases, and/or service KPI drops, then a determination may be made that the UE is to be activated for operation with one or more network devices on an NT-TRP tier or offloaded from a T-TRP tier to an NT-TRP tier. Such UE activation or offloading may be reversed in response to a change in conditions, for instance to deactivate the UE on the NT-TRP tier or transition the UE from the NT-TRP tier to the T-TRP tier in the above example if UE speed decreases below a threshold.

Applying conventional measurement and reporting procedures to mobility management in an integrated communication network may present significant challenges at least in the sense that such procedures may substantially increase the time and resources involved in periodic radio link measurements by a UE.

One aspect of the present disclosure relates to the introduction of mobility measurement activation and deactivation, enabled by a network node. Signaling, which is physical layer-based signaling in some embodiments, is used to control activation of a UE for operation with network devices of different network tiers, which may transition a UE between different network tiers, for example by indicating to the UE the radio links on which network tier that are to be monitored and reported on by the UE. In an integrated wireless communication network, there may be multiple reference signals from, for example, T-TRPs and any of various types of NT-TRPs such as drone-based NT-TRPs, plane-based NT-TRPs, and satellite-based NT-TRPs. UEs cannot be expected to monitor radio link quality from all individual links all the time, due to power management considerations and the amount of signal processing capacity available to the UE to perform detection and measurement on reference signals transmitted by various TRPs. Embodiments of the present disclosure enable selective activation, deactivation, or both activation and deactivation of links to be monitored for mobility management.

In an illustrative embodiment, a UE in an integrated terrestrial/non-terrestrial network system is transferred from one tier that includes one or more T-TRPs to another tier that includes one or more NT-TRPs, and the UE is instructed to deactivate mobility measurements based on the T-TRP(s).

In other embodiments, a UE may be activated for operation with one or more network devices of one tier and still maintain at least some form of operation with one or more network devices of a different tier. The UE may monitor reference signals from the network devices of both tiers, for example. Mobility management may involve deactivating a UE for operation with one or more network devices on one tier without necessarily also activating the UE for operation with one or more network devices on another tier. Consider the above example of a UE that monitors reference signals from the network devices of two tiers. Such a UE may be deactivated for operation with the network device(s) of one of the tiers and need not be activated for operation with the network device(s) of the other tier.

Operation of a UE with a network device encompasses such aspects of UE operation as: monitoring radio link quality based on mobility reference signals for example; and control/data reception or transmission. Activating a UE for operation with a network device of a particular tier may therefore involve enabling, configuring, or otherwise controlling the UE to communicate either or both of control and data with the network device. Communicating control and/or data may involve reception, transmission, or both. Activating a UE for operation with a network device may also or instead involve enabling, configuring, or otherwise controlling the UE to monitor mobility reference signals from the network device, and possibly other network devices of the same tier as the network device. Deactivating a UE for operation with a network device may involve disabling, reconfiguring, or otherwise controlling the UE to stop communicating either or both of control and data with the network device, and may also or instead involve disabling, reconfiguring, or otherwise controlling the UE to stop monitoring mobility reference signals from the network device and possibly other network devices of the same tier as the network device. One or more commands, configurations, reconfigurations, or configuration changes, examples of which are provided herein, may be used to activate a UE for operation with a network device, to deactivate a UE for operation with a network device, or to change operation of a UE between operation with one network device and operation with a different network device.

Mobility management according to embodiments disclosed herein may therefore involve either or both of activation and deactivation. Activation and deactivation can be decoupled from each other in some embodiments.

Figure 4:
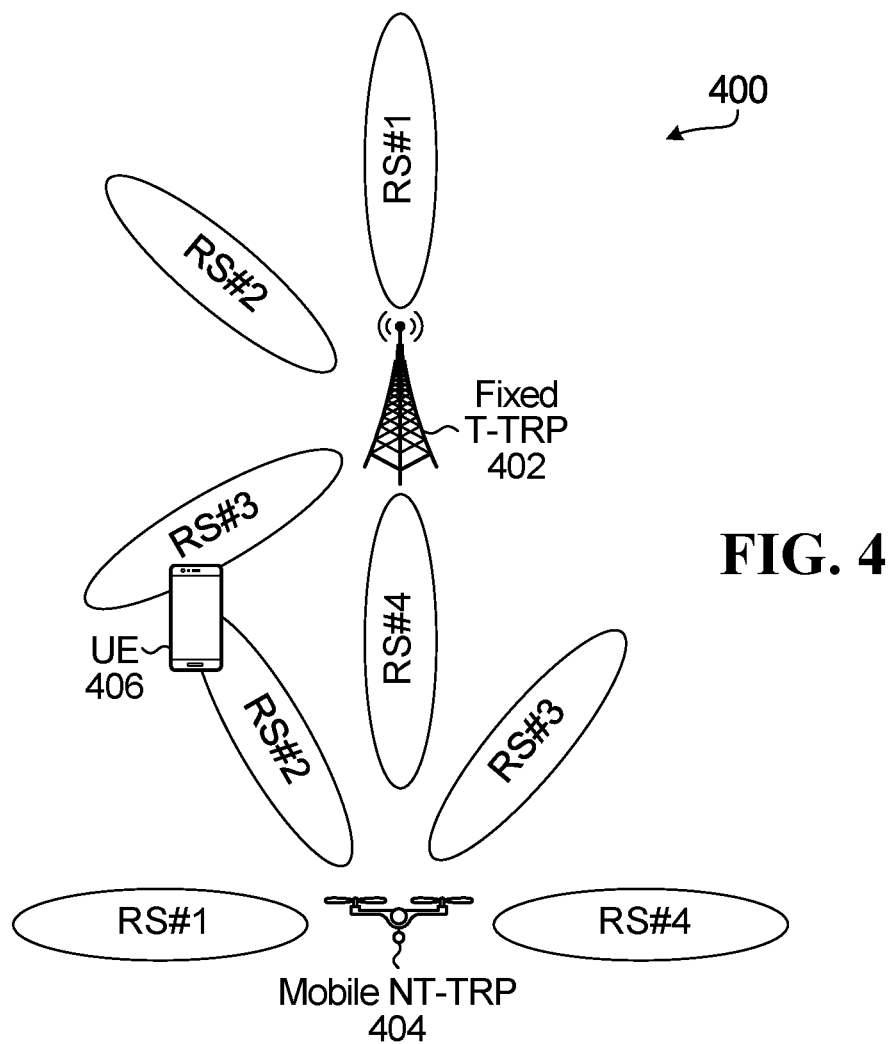
FIG. 4 is a block diagram illustrating an example integrated communication network with a fixed network device and a mobile network device.

FIG. 4 is a block diagram illustrating an example integrated communication network 400 with a fixed network device, shown by way of example as a fixed T-TRP 402, and a mobile network device, shown by way of example as a mobile NT-TRP 404. The network 400 is typical of a type of network that might be implemented in an urban deployment, for example. The T-TRP 402 and the NT-TRP 404 are associated with different tiers of the network 400. Either or both of these different tiers, and/or other tiers, may include one or more other network devices in addition to those shown.

Conventional terrestrial network deployments include stationary base stations. UEs are assumed to be on the ground, and it is assumed that when UEs connect to the terrestrial network, they transmit positioning reference signals to the network, allowing the network to infer the position of the UEs. Depending on factors such as the time of the day and the locations of buildings, traffic demand can emerge at various locations and various times. In order to meet such on-demand traffic constraints, mobile/flying radio-heads, carried by drones for example, may be introduced to serve UEs that are associated with the on-demand traffic.

For illustrative purposes, suppose that the UE 406 in FIG. 4 completed an initial access procedure and obtained an initial configuration from the network regarding mobility measurements based on T-TRPs. The UE 406 uses the initial configuration to detect and measure T-TRP-based mobility reference signals. This initial configuration can be provided to the UE 406 using higher-layer signaling in the form of resource sets and resources provided for each tier, for example. Each configuration of resources to be used for mobility measurements can carry information such as any one or more of resource identity, time/frequency location, measurement periodicity, sequence generation information such as a sequence generation identifier, mobility resource antenna beam information such as azimuth angle and zenith angle, etc. Tier information, such as either or both of tier type (terrestrial, non-terrestrial) and tier identity, can be provided per resource or per resource set. Resources and/or resource sets may instead be configured specifically per tier.

An example of a mobility resource configuration that may be provided by higher-layer signaling is provided below:
1> MobilityResourceSet
  2> MobilityResourceSetId
  2> TierType={terrestrial; non-terrestrial}
  2> TierId
  2> MobilityResourceList
    3> MobilityResourceId
    3> MobilityResourcePeriodicity={5; 10; 20; 40; 80; 160}
    3> MobilityResourceFrequency
      4> StartingResourceBlock
      4> NumberOfResourceBlocks
    3> MobliityRescurceSequenceGenerationId
    3> MobilityResourceBeamInformation
      4> AzimuthAngle
      4> ZenithAngle In the above example, the higher-layer signaling carries information about one or more sets of reference signals to be detected and measured for mobility measurements, designated as MobilityResourceSet. A given set of reference signals for the purpose of mobility measurements is provided with a corresponding identity MobilityResourceSetId in this example, and may additionally be provided with the corresponding network tier. The corresponding network tier can be identified using the tier type given by TierType and the tier identity given by TierId. For each mobility resource set, a corresponding list containing one or more reference signals is given by the higher-layer parameter MobilityResourceList. Each reference signal in the set of mobility resources is given configuration information such as an identity MobilityResourceId, time and frequency configuration given respectively by MobilityResourcePeriodicity and MobilityResourceFrequency, reference signal sequence initialization information given by MobilityResourceSequenceGenerationId, and corresponding receive beam information given by MobilityResourceBeamInformation.

In the above example, each reference signal to be detected and measured for mobility measurements is given time configuration using MobilityResourcePeriodicity, which provides the periodicity with which measurements are to be performed by the UE. The periodicity of the measurements can be given on different time granularities such as: OFDM symbol, mini-slot, slot, subframe or frame, and in the above example the MobilityResourcePeriodicity field is given in slots. The frequency bandwidth occupied by the reference signal is given in physical resource blocks using StartingResourceBlock which provides the lower edge of the frequency bandwidth and NumberOfResourceBlocks which provides the frequency bandwidth occupied by the reference signal. The receive beam information is provided in order to assist the UE in detecting and measuring the mobility reference signal, using AzimuthAngle and ZenithAngle which respectively indicate the azimuth and zenith angle towards which the UE should steer its receive beam.

In other embodiments, reference signals may be configured to be detected and measured for mobility measurements in one common set, where each reference signal is individually assigned to a given tier, such as terrestrial or non-terrestrial for example. Each reference signal may also be given additional information about timing configuration, such as system frame number, subframe number, and OFDM symbols where the reference signals are located.

In other embodiments, reference signals may be configured to be detected and measured for mobility measurements such that each reference signal is provided with its own receive beam information in order to assist the UE in detecting and measuring the mobility reference signal. This receive beam information may include AzimuthAngle and ZenithAngle, for example, to indicate the azimuth and zenith angle towards which the UE should steer its receive beam.

In other embodiments, reference signals may be configured to be detected and measured for mobility measurements such that each reference signal is provided a center frequency in order to assist the UE in detecting and measuring the mobility reference signal. This center frequency may be provided in addition to StartingResourceBlock and NumberOfResourceBlocks for example. Similarly, reference signals may be configured in one common set, where each reference signal is configured with a center frequency.

In other embodiments, reference signals may be configured to be detected and measured in one common set where the common set of mobility reference signals is transmitted by a TRP of a certain type or category. The mobility resource set may be explicitly associated to a TRP of a certain type or category, e.g. by providing TierType, or may be implicitly associated to a TRP of a certain type or category, by providing MobilityResourceSetId for example. Similarly, a mobility reference signal transmitted by a TRP of a certain type or category may be explicitly associated to a TRP by providing information about TierType, or implicitly associated to a TRP by providing information about MobilityResourceId, for example.

When the UE 406 is to be transferred from a T-TRP such as 402 of one tier to an NT-TRP such as 404 of a different tier, or perhaps more generally when the UE 406 is to be activated for operation with the NT-TRP 404, signaling is used for controlling activation of the UE for operation with the T-TRP and the NT-TRP of different tiers. A transition or transfer decision, or more generally an activation change decision, may be made by a network node, controller, or management system, for example, based on any of various criteria. Examples of such criteria are provided elsewhere herein. In an embodiment, a Layer 1 (L1) based dynamic mobility signaling message is transmitted to and received by the UE 406 to activate the UE for control/data reception from the NT-TRP 404.

Figure 5:
FIG. 5 is a time plot illustrating a switch in control/data reception according to an embodiment.

FIG. 5 is a time plot illustrating a switch in control/data reception from the T-TRP 402 to the NT-TRP 404 by the UE 406 according to an embodiment. In the example shown, the dynamic mobility signaling message is in the form of Mobility Control Information (MCI).

Once the UE 406 has successfully performed the switch from the T-TRP 402 to the NT-TRP 404 and the UE is receiving control/data transmissions from the NT-TRP in this example, a mobility command may be sent to and received by the UE using the NT-TRP to instruct the UE to deactivate mobility measurements from the T-TRP and any other network devices of the tier from which the UE has transitioned. Such a mobility command can be a physical layer command or a higher-layer command, such as a Medium Access Control (MAC) layer command, a Radio Link Control (RLC) layer command, a Packet Data Convergence Protocol (PDCP) layer command or a command associated with a sub-layer of one of these example layers. Responsive to receipt of a deactivation command of mobility measurements from network devices in the tier to which the T-TRP 402 belongs, the UE 406 stops monitoring mobility reference signals being sent from those network devices, including the T-TRP 402. In FIG. 4, for example, the UE 406 stops detecting and measuring the beams labelled RS #1-RS #4 from the T-TRP 402, and any other beams associated with any other network devices in the same tier as the T-TRP.

Deactivating mobility measurements on the T-TRP 402 and any other network devices in the same tier as the T-TRP may help the UE 406 save power and instead spend its time and processing power for receiving signals/channels from the NT-TRP 404. A deactivation command can be a physical layer command or a higher-layer command as noted above, and an illustrative example of such a command is provided below:
1> MobilityControlInformation
  2> TierId—4 bits
  2> CommandType—1 bit
  2> MobilityResourceSetId—32 bits The TierId field is an example of information that is indicative of a tier, and designates the identity of the tier being deactivated. The CommandType field in this example is a 1-bit indication as to whether the command is activating (field is set to 1, for example) or deactivating (field is set to 0, for example) measurements on the resources defined in the identified tier. In case a partial deactivation of a tier is to be instructed, the MobilityResourceSetId field can be used to indicate which mobility resource sets within the identified tier are to remain active, and the UE 406 continues to detect and monitor those mobility resources. In another embodiment, the MobilityResourceSetId field can be used to indicate mobility resources that are to be deactivated, and they UE 406 continues to detect and monitor mobility resources, other than those specified in the MobilityResourceSetId field, that are associated with the identified tier.

Other command formats and types are possible. The foregoing is an illustrative and non-limiting example.

As noted elsewhere, activation and deactivation may be decoupled in some embodiments. One example above involves a switch from the T-TRP 402 to the NT-TRP 404, with activation and deactivation. In another embodiment, the UE 406 may be activated for operation with the NT-TRP 404 without necessarily being deactivated for operation with the T-TRP 402.

Figure 6:
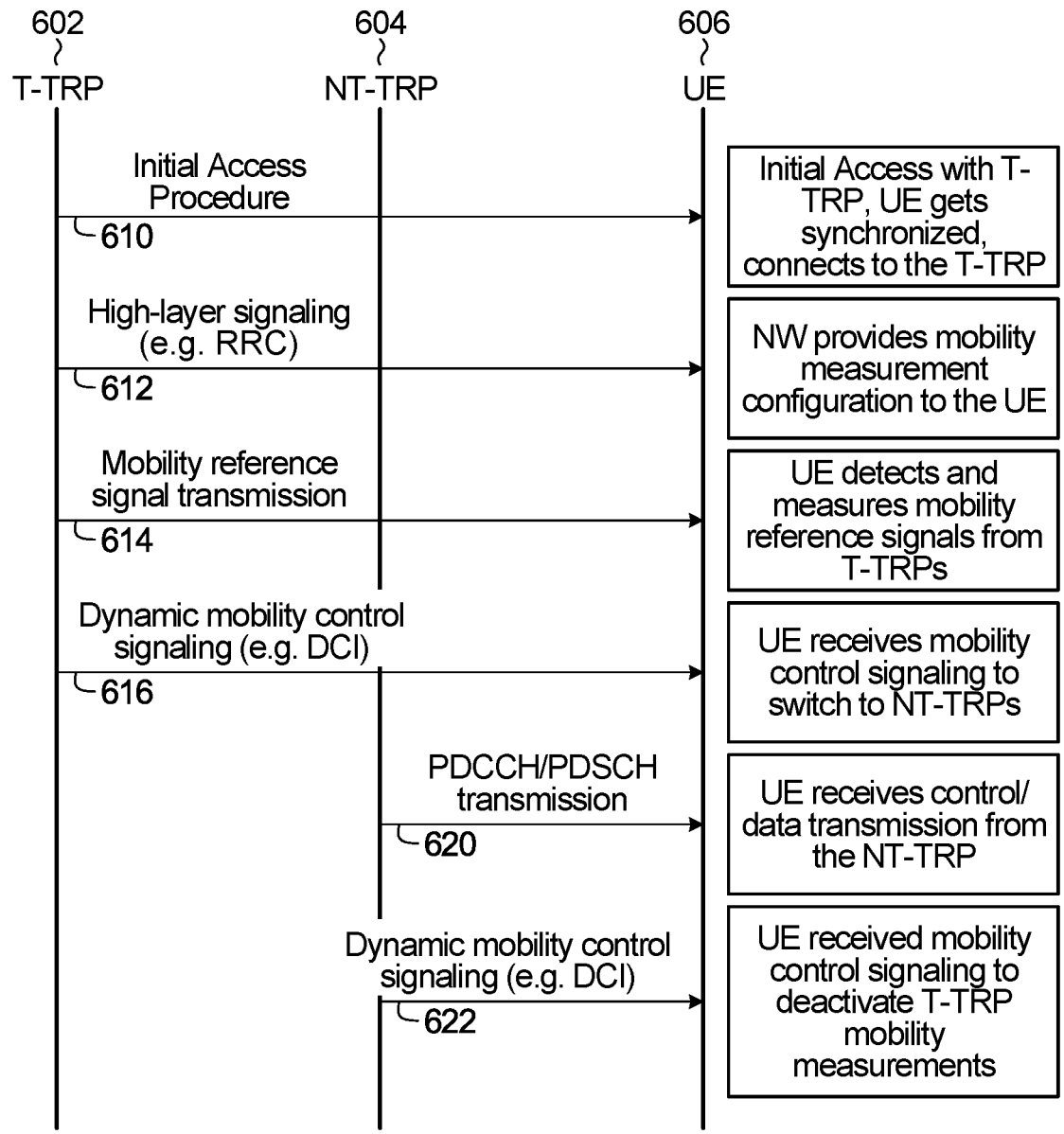
FIG. 6 is a signal flow diagram illustrating signaling according to an embodiment.

FIG. 6 is a signal flow diagram illustrating signaling between a UE 606, a T-TRP 602, and an NT-TRP 604 according to an embodiment in which the T-TRP and the NT-TRP are in different network tiers.

For completeness, an initial access procedure between the UE 606 and the T-TRP 602 is illustrated at 610. The UE 606 is synchronized with the T-TRP 602 and connects to the T-TRP. At 612, a mobility measurement configuration is provided to the UE 606 by the T-TRP 602, in higher-layer signaling shown by way of example as RRC signaling in FIG. 6. Mobility reference signals are transmitted to and received by the UE 606 from the T-TRP 602 at 614, and the UE detects the mobility reference signals and performs measurements. The UE 606 may also report measurements, but measurement reporting is not shown in FIG. 6 in order to avoid further congestion in the drawing. The UE may perform detection, measurement, and reporting based on mobility reference signals transmitted by and received from one or more other network devices in the same tier as the T-TRP 602 as well, even though only one T-TRP is shown in FIG. 6.

Dynamic mobility control signaling 616, shown by way of example in FIG. 6 as Downlink Control Information (DCI), is transmitted by the T-TRP 602 and received by the UE 606, to switch the UE from the T-TRP to a different tier that includes the NT-TRP 604 and possibly other network devices. At 620, FIG. 6 illustrates a control/data transmission by way of example as a PDCCH/PDSCH transmission, from the NT-TRP 604 and received by the UE 606. Mobility control signaling 622, shown by way of example as DCI, is optionally transmitted by the NT-TRP 604 and received by the UE 606 to deactivate UE mobility measurements associated with the T-TRP tier that includes the T-TRP 602.

FIG. 6 is illustrative of an embodiment that involves communicating, in a multi-tier wireless communication network, signaling that includes tier activation information for controlling activation of a UE for operation with a network device of a first tier and a network device of a second tier. In FIG. 6, the network devices 602, 604 are distributed among multiple tiers that include a terrestrial tier to which the T-TRP belongs and a non-terrestrial tier to which the NT-TRP belongs. The dynamic mobility control signaling 616, 622 are both examples of signaling for controlling activation of the UE. Although reference is made herein to controlling activation and to activating or deactivating the UE for operation with specific network devices, this is simply for illustrative purposes. Controlling activation of a UE is tier-based, and references to specific network devices in this context are solely for illustrative purposes. UE activation for operation with a network device of a tier is intended to convey the notion of activation of the UE for any of the one or more network devices that belong to a tier.

Controlling activation may involve either or both of: activating the UE 606 for operation with the network device 604 of the non-terrestrial tier at 616; and deactivating the UE for operation with the network device 602 of the terrestrial tier.

Tier activation information for controlling activation of the UE 606 may be or include one or both of: a command, in the signaling 616 for example, for activating the UE for operation with the NT-TRP 604 of the non-terrestrial tier; and a command for deactivating the UE for operation with the T-TRP 602 of the terrestrial tier.

Other forms of commands are also possible. For example, tier activation information for controlling activation of the UE 606 may be or include a single command for both activating the UE for operation with the NT-TRP 604 of the non-terrestrial tier and deactivating the UE for operation with the T-TRP 602 of the terrestrial tier.

Controlling activation involves activation and/or deactivation in some embodiments. In other embodiments, controlling activation may involve otherwise changing operation of a UE between operation with a network device of a first tier and operation with a network device of a second tier. For example, controlling activation may involve changing configuration settings of the UE 606 so that the UE begins receiving control/data transmissions from the NT-TRP 604. The UE 606 may or may not continue to operate with the T-TRP 602 in some embodiments, for detection, measurement, and reporting of mobility reference signaling for example. In FIG. 6, operation of the UE 606 is changed between operation with network devices of two tiers in the sense that operation changes from operation with the T-TRP 602 of the terrestrial tier to operation with the NT-TRP 604 of the non-terrestrial tier. An operation change may also or instead be in the opposite direction, as discussed by way of example below with reference to FIG. 9.

Operation of a UE with a network device may involve detecting, measuring, and reporting associated with reference signals for mobility transmitted by and received from the network device. Another example of operation of a UE with a network device is communicating one or both of control and data transmissions with the network device. In FIG. 6, these types of operation are illustrated at 614 for detecting and measuring associated with reference signals for mobility transmitted by and received from the T-TRP 602, and at 620 for communicating control/data transmissions with the NT-TRP 604, and in particular transmitting by the NT-TRP 604 and receiving by the UE 606.

Although not explicitly shown in FIG. 6, an operation of determining whether activation of the UE 606 for operation with the T-TRP 602 of the terrestrial tier or the NT-TRP 604 of the non-terrestrial tier is to be changed may be performed by the T-TRP 602, or potentially by another network device or component. Communicating the signaling at 616 may then involve transmitting the signaling to the UE 606 responsive to determining that activation of the UE for operation with the T-TRP 602 or the NT-TRP 604 is to be changed.

This type of determining may be based on any of various criteria, such as one or more of the following: velocity of a UE relative to one or more network devices of a tier, such as the terrestrial tier or the non-terrestrial tier in the example of FIG. 6; Doppler shift associated with one or more network devices of a tier, such as the terrestrial tier or the non-terrestrial tier in the example of FIG. 6; and loading of one or more network devices of a tier, such as the terrestrial tier or the non-terrestrial tier in the example of FIG. 6.

Determination of an activation change is expected to be a network-side feature, implemented in one or more network devices or one or more other network components such as a controller or management system. At the UE side, communicating signaling for controlling activation of the UE involves receiving the signaling, and a method may also involve any one or more of the following: activating the UE for operation with the network device of a tier, such as the non-terrestrial tier in the example shown in FIG. 6, responsive to receiving the signaling; deactivating the UE for operation with the network device of a tier, such as the terrestrial tier in the example shown in FIG. 6, responsive to receiving the signaling; and changing operation of the UE between operation with network devices of different tiers, from the T-TRP 602 of the terrestrial tier to the NT-TRP 604 of the non-terrestrial tier in the example shown in FIG. 6, responsive to receiving the signaling.

Various examples of signaling for controlling activation of a UE are provided in FIG. 6 and elsewhere herein. These include at least the following:

the tier activation information is or includes information that is indicative of one or more communication resources, with the one or more communication resources including a communication resource that is to be monitored by the UE, a communication resource that is not to be monitored by the UE, or both a communication resource that is to be monitored by the UE and a communication resource that is not to be monitored by the UE;

the tier activation information is or includes information that is indicative of one or both of a tier from which the UE is to be deactivated and a tier to which the UE is to be activated;

the signaling is or includes MCI, DCI, or MAC signaling.

Mobility management as described by way of example with reference to FIGS. 4 to 6 may enable smooth cross-tier mobility. UEs can be transitioned or transferred from one tier to another seamlessly, such that user experience is interruption-free. A UE need not necessarily be switched, transitioned, or transferred between tiers, and may be activated for operation with one or more network devices on one tier without necessarily being deactivated for operation with one or more network devices on another tier.

Network-controlled mobility measurements are also enabled by this type of mobility management. The mobility reference signals that a UE monitors at any given time are controlled from the network. UEs do not waste time or processing power on detecting and measuring radio links from tiers other than a current tier in which or on which the UE is currently operating in some embodiments.

These embodiments are relevant to mobility management in integrated terrestrial/non-terrestrial networks, and provide a framework in which a UE can be instructed, from a network, to turn off mobility measurement and reporting on a given tier.

Figure 7:
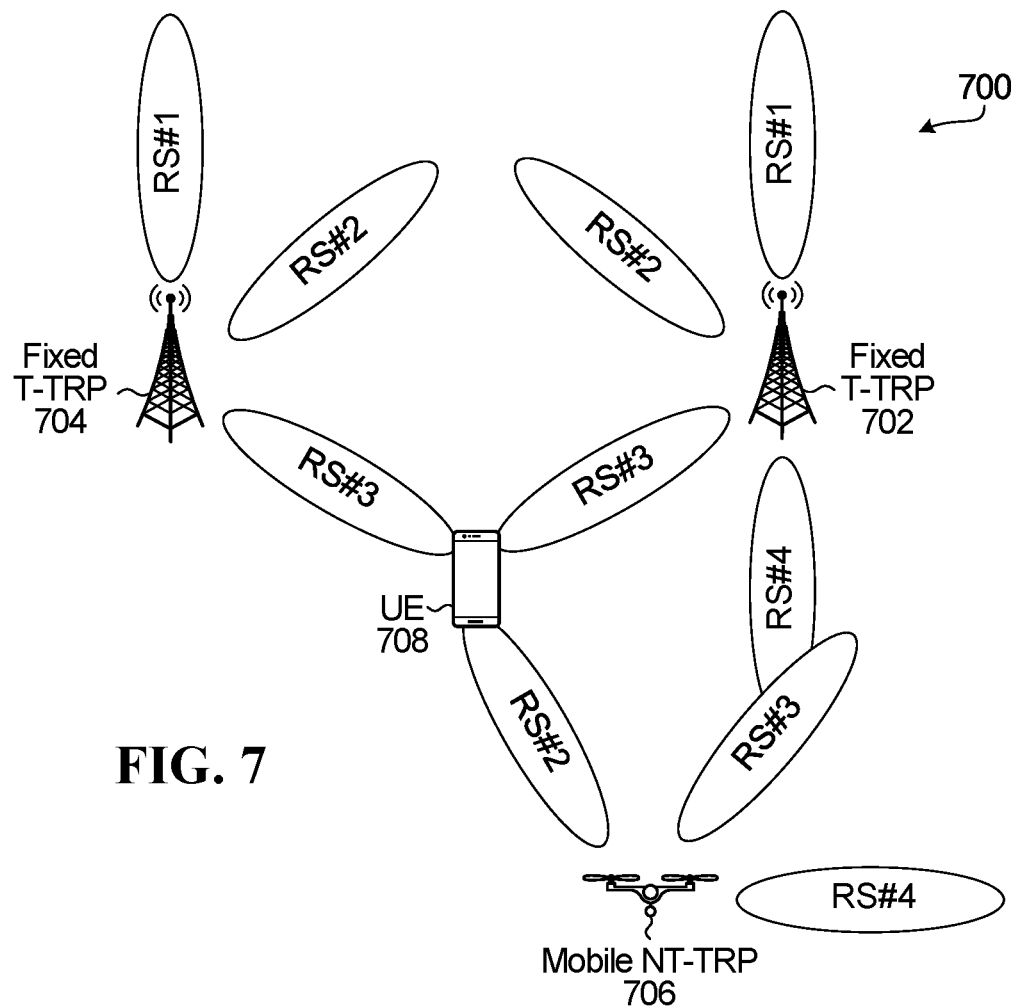
FIG. 7 is a block diagram illustrating another example integrated communication network with two fixed network devices and a mobile network device.

FIG. 7 is a block diagram illustrating another example integrated communication network 700 with two fixed network devices, shown by way of example as fixed T-TRPs 702, 704, and a mobile network device, shown by way of example as a mobile NT-TRP 706. The T-TRPs 702, 704 are associated with one network tier of the network 700, and the NT-TRP 706 is associated with a different network tier. Either or both of these different tiers, and/or other tiers, may include one or more other network devices in addition to those shown. An example in the context of such an integrated terrestrial/non-terrestrial network system, in which a UE 708 is transitioned or transferred from one tier that includes the NT-TRP 706 to another tier that includes the T-TRPs 702, 704, and is instructed from the network to activate mobility measurements based on the T-TRPs, is described below with reference to FIG. 7.

For this example of an overall process of beam indication in integrated terrestrial/non-terrestrial networks, suppose that the UE 708 is connected to the NT-TRP 706, is receiving control/data transmissions from the NT-TRP, and has turned off mobility measurement and reporting for the T-TRPs 702, 704. Mobility measurement and reporting for the T-TRPs 702, 704 may have been turned off by the UE 708 when the UE was transferred to the NT-TRP 706 and the NT-TRP sent an L1-based mobility command to the UE to deactivate mobility measurements from the T-TRPs, for example.

When a determination has been made that the UE 708 should be transferred to the T-TRP tier that includes the T-TRPs 702, 704 in the example shown, the UE can be instructed from the network to activate mobility measurements based on the T-TRPs, for example by sending via the NT-TRP 706 an L1-based mobility command to activate mobility measurements. An example of an activation command is provided below:

1> MobilityControlInformation
    2> TierId—4 bits
    2> CommandType—1 bit
    2> MobilityResourceSetId—32 bits
    2> BeamInformation—4 bits In this example, the TierId field designates the identity of the tier being activated, and the CommandType field is a 1-bit indication which indicates whether the command is activating (field is set to 1, for example) or deactivating (field is set to 0, for example) measurements on the resources defined in the identified tier. For a partial activation of a tier, the MobilityResourceSetId field can be used to indicate which mobility resource sets within the identified tier are to be active, and the UE will detect and monitor those mobility resources. Alternatively, the MobilityResourceSetId field can be used to indicate mobility resources sets that are exceptions to the activation command and are not to be monitored by the UE 708. The Beam Information field designates a receive spatial filtering assumption to be used to detect and monitor the resources on the activated tier in some embodiments, and represents an example of information that is indicative of beams or mobility reference signals for which monitoring is being activated.

In some embodiments, the UE may be configured with only one mobility resource set per tier. In such cases, a physical layer based mobility command may activate (and/or deactivate) a given mobility reference signal identified by MobilityResourceId on a given network tier identified by TierId. The provision of TierId and MobilityResourceId allows the UE to uniquely determine which mobility resource within the identified tier is to be active, and the UE will detect and monitor that mobility resource.

Following reception of an L1-based mobility command, or more generally responsive to receipt of signaling that includes tier activation information for activation of mobility reference signal monitoring for the T-TRP tier, the UE 708 starts monitoring mobility reference signals sent by the T-TRPs 702, 704, for the purpose of determining the best available T-TRP. The best available T-TRP may be determined using any one or more of various criteria, such as RSRP, filtering/averaging period, number of reference signals, and so on.

When the UE 708 starts monitoring mobility reference signals from the T-TRPs 702, 704, it can determine the best available T-TRP, and in some embodiments the UE reports the best T-TRP to the NT-TRP 706. Based on the best T-TRP reported by the UE 708, the NT-TRP 706 and the best T-TRP can negotiate when and how to transfer the UE 708 to the best T-TRP. Such negotiation need not necessarily be performed in all embodiments.

Activating mobility measurements on the T-TRPs 702, 704 may be useful in preparing to transfer the UE 708 from the NT-TRP 706 to the best T-TRP.

Figure 8:
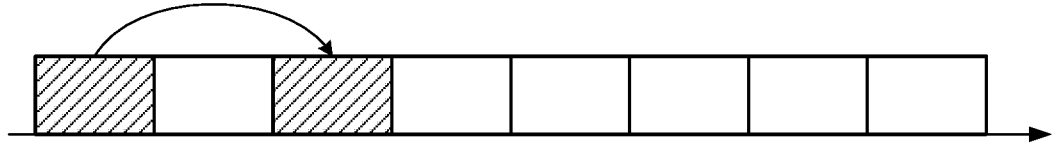
FIG. 8 is a time plot illustrating scheduling of a data transmission according to an embodiment.

FIG. 8 is a time plot illustrating scheduling of a data transmission according to an embodiment. FIG. 8 is intended to show that MCI could schedule a data transmission, similar to how a PDCCH schedules a PDSCH for example, where data is any signaling information that is provided for mobility purposes, such as MobilityResourceSet in some embodiments.

Figure 9:
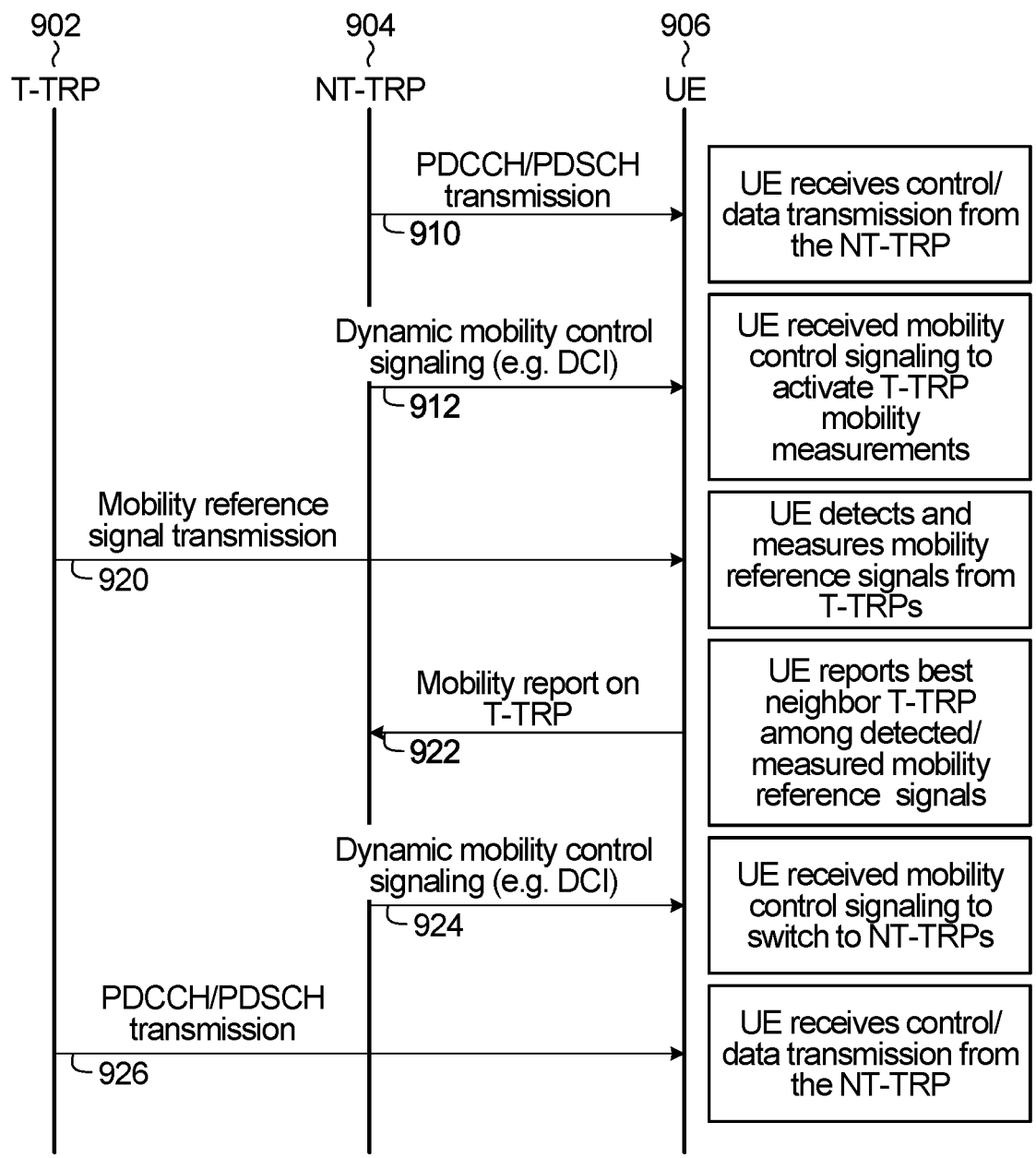
FIG. 9 is a signal flow diagram illustrating signaling according to another embodiment.

FIG. 9 is a signal flow diagram illustrating signaling between a UE 906, a T-TRP 902, and an NT-TRP 904 associated with transitioning a UE from the NT-TRP to the T-TRP. The T-TRP 902 and the NT-TRP 904 are in different network tiers.

In FIG. 9, the UE 906 has been activated for operation with the NT-TRP 904, and receives at least control transmissions and/or data transmissions from the NT-TRP as shown by way of example at 910 as a PDCCH/PDSCH transmission. The UE 906 may also detect and measure mobility reference signals from the NT-TRP 904 and/or other network devices in the non-terrestrial tier with the NT-TRP and report on the measurements. This state of activation of the UE 906 may be the end result of the signaling shown in FIG. 6, for example. In other embodiments, the UE 906 is synchronized with the NT-TRP 904 and connects to the NT-TRP in an initial access procedure between the UE and the NT-TRP.

Dynamic mobility control signaling 912, shown by way of example in FIG. 9 as DCI, is transmitted by the NT-TRP 904 and received by the UE 906, to switch the UE from the NT-TRP 904 to a different tier that includes the T-TRP 902 and possibly other network devices. Mobility reference signals are transmitted to and received by the UE 906 from the T-TRP 902 at 920, and the UE detects the mobility reference signals and performs measurements. The UE 906 transmits a mobility report 922 to the NT-TRP 904, identifying the best neighbor T-TRP among detected and measured mobility reference signals. The UE may detect and measure mobility reference signals transmitted by and received from one or more other network devices in the same tier as the T-TRP 902, and determine and report the best T-TRP to the NT-TRP 904 as shown in FIG. 9. In another embodiment, measurements are reported to the NT-TRP or to another network device or component for determination of the best T-TRP.

The UE 906 receives further dynamic mobility control signaling 924 transmitted by the NT-TRP 904 to switch the UE to the best T-TRP, which is the T-TRP 902 in this example. At 926, FIG. 9 illustrates a control/data transmission by way of example as a PDCCH/PDSCH transmission, from the T-TRP 902 and received by the UE 906. Further mobility control signaling is optionally transmitted by the NT-TRP 904 or the T-TRP 902 and received by the UE 906 to deactivate UE mobility measurements associated with the non-terrestrial tier that includes the NT-TRP 904.

FIG. 6 illustrates one embodiment of a method that involves communicating signaling in a multi-tier wireless communication network, and FIG. 9 is consistent with another embodiment. In FIG. 6 the UE 606 is activated for operation with the NT-TRP 604, and in FIG. 9 the UE 906 is activated for operation with the T-TRP 902. Both of these embodiments involve signaling that includes tier activation information for controlling activation of a UE for operation with a network device of a first tier and a network device of a second tier. In FIG. 9, the signaling 912 and the signaling 922 are both examples of such signaling, transmitted by the NT-TRP 904 and received by the UE 906. The signaling 912 is for activating the UE 906 for mobility reference signal detection and measurement in the terrestrial tier that includes the T-TRP 902, and the signaling 922 is for activating the UE for communicating one or both of control and data with the T-TRP.

Other features and examples disclosed elsewhere herein, including those described with reference to FIG. 6, may also apply to FIG. 9.

For example, controlling activation may involve either or both of: activating the UE 906 for operation with the network device 902 of the terrestrial tier at 912, 922; and deactivating the UE for operation with the network device 904 of the non-terrestrial tier. Controlling activation of a UE may also or instead involve otherwise changing UE operation. Signaling for controlling activation may include one or more commands for activating and/or deactivating the UE 906 for operation with the T-TRP 902 and/or the NT-TRP 904. Other forms of commands and signaling are also disclosed elsewhere herein. For example, signaling for controlling activation of the UE 606 may be or include a single command for both activating the UE for operation with the NT-TRP 604 of the non-terrestrial tier and deactivating the UE for operation with the T-TRP 602 of the terrestrial tier.

In FIG. 9, the NT-TRP 904 or another network device or component may determine whether activation of the UE 906 for operation with the T-TRP 902 of the terrestrial tier or the NT-TRP the non-terrestrial tier is to be changed, and the signaling 912 and/or 922 may be transmitted to the UE responsive to determining that activation of the UE for operation with the T-TRP or the NT-TRP is to be changed. Examples of criteria based upon which such determining may be based are provided elsewhere herein.

At the UE side, communicating signaling that includes tier activation information for controlling activation of a UE involves receiving the signaling, and a method may involve any one or more of the following: activating the UE for operation with the network device of a tier, such as the terrestrial tier in the example shown in FIG. 9, responsive to receiving the signaling; deactivating the UE for operation with the network device of a tier, such as the non-terrestrial tier in the example shown in FIG. 9, responsive to receiving the signaling; and changing operation of the UE between operation with network devices of different tiers, from the NT-TRP 904 of the non-terrestrial tier to the T-TRP 902 of the terrestrial tier in the example shown in FIG. 9, responsive to receiving the signaling.

Similar to UE transition from a T-TRP network tier to an NT-TRP network tier as described by way of example above, UE transition from an NT-TRP network tier to a T-TRP network tier may enable smooth cross-tier mobility and network-controlled mobility measurements, and provide a framework in which a UE can be instructed, from a network, to turn on mobility measurement and reporting on a given tier.

Another aspect of the present disclosure relates to UE monitoring of a mobility event in an integrated terrestrial/non-terrestrial network based on speed, using Doppler shift as a criterion for mobility reporting.

Figure 10:
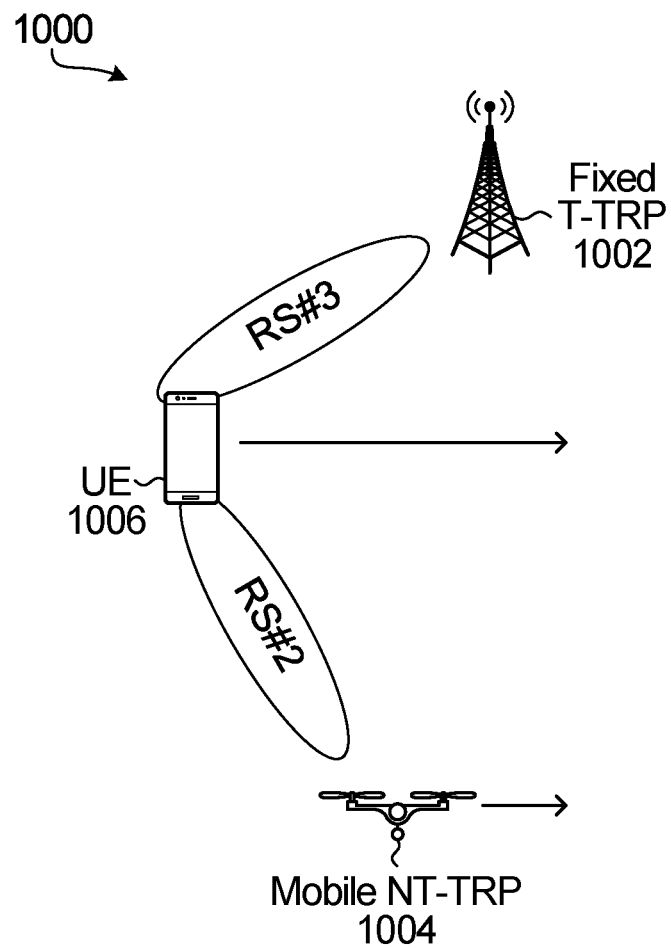
FIG. 10 is a block diagram illustrating a further example integrated communication network.

Consider FIG. 10, which is a block diagram illustrating a further example integrated communication network 1000 with a fixed network device in the form of a fixed T-TRP 1002 and a mobile network device in the form of a mobile NT-TRP 1004. For illustrative purposes, suppose that the UE 1006 is connected to the T-TRP 1002, is traveling at speed, and is monitoring mobility events based on different reference signals that are transmitted by the different TRPs, including the T-TRP 1002 and the NT-TRP 1004 in FIG. 10. Velocities of the NT-TRP 1004 and the UE 1006 are represented by the arrows in FIG. 10.

Further suppose that the UE 1006 is configured to detect a so-called velocity beam event, involving RS #2 and RS #3. With the UE 1006 traveling at 50 km/h, the NT-TRP 1004 traveling at 30 km/h and the T-TRP 1002 and the NT-TRP using a carrier frequency of 2 GHz, the UE detects a higher Doppler shift with respect to RS #3 given that the T-TRP 1002 is fixed, as shown in the example below:

```
1> Velocity-ReportConfig
   2> reportConfigId=
   2> reportConfigType
      3> event-VBM1
         4> resource1
            5> RS-Id=2
            5> scramblingId=57
            5> speed=30
         4> resource2
            5> RS-Id=3
            5> scramblingId=9
            5> speed=0
         4> measQuantity=motion
         4> threshold-mps=0.01
         4> duration-ms=20
```

In the above example, the UE is configured to report mobility events based on velocity. This configuration is provided using the higher-layer signaling Velocity-Report- Config, and the UE may be provided with one or more higher-layer signaling for velocity-based mobility event configurations. Each velocity-based reporting configuration is given a reporting configuration identity reportConfigId. Each velocity-based reporting configuration is further given an event configuration type event-VBM1. For event configuration event-VBM1, the UE is provided with two mobility reference signal configurations given by resource1 and resource2, respectively. The event configuration is further provided with a measurement quantity information measQuantity. The value of measQuantity is given as "motion" in this example, in order to instruct the UE to measure the Doppler shift. The event configuration also includes a velocity threshold given in meters per second by threshold-mps and a duration given in milliseconds by duration-ms for which the velocity event is triggered. In the context of this example, resource1 and resource2 are provided with a higher-layer parameter denoted as speed, which the UE uses as the traveling speed of the transmitter transmitting that mobility reference signal to determine the corresponding Doppler shift measurement. This velocity-based mobility event is considered to be triggered if:

the measured Doppler shift of resource1 is lower than threshold-mps for a duration of duration-ms the measured Doppler shift of resource2 is higher than threshold-mps for a duration of duration-ms When the event is triggered, the UE sends a corresponding mobility measurement report back to its serving TRP, which may be a T-TRP or an NT-TRP. The mobility measurement report carries the results of the measurements performed by the UE. Upon reception of the mobility measurement report, the serving TRP or potentially another network device or component to which the mobility measurement report is forwarded may then decide to transition the UE to the appropriate network tier.

In other examples, the UE may be configured to report mobility events based on velocity using other types of reporting configurations. In a first example, a velocity-based mobility event configuration, for an event-VBM2 for example, includes information about resource1, with parameter measQuantity set to "motion" to indicate Doppler shift measurement, with parameter speed set to a given value to indicate the traveling speed of the transmitter of resource1 to the UE, with parameter threshold-mps set to a given value, and parameter duration-ms set to a given value. In this example, the event is triggered when the Doppler shift measured on resource1 is lower than threshold-mps for a duration of duration-ms.

In a second example, a velocity-based mobility event configuration, event-VBM3 for example, carries information about resource1 and resource2, with parameter measQuantity set to "motion" to indicate Doppler shift measurement, with respective parameters speed set to a given value to indicate the traveling speed of the transmitter of resource1 and resource2 respectively, and with parameter duration-ms set to a given value. In this example, the event is triggered when the Doppler shift measured on resource1 is lower than the Doppler shift measured on resource2 for a duration of duration-ms.

In a third example, a velocity-based mobility event configuration, event-VBM4 for example, carries information about resource1, with parameter measQuantity set to "motion" to indicate Doppler shift measurement, with parameter speed set to a given value to indicate the traveling speed of the transmitter of resource1, with parameter threshold-mps set to a given value, and with a parameter threshold-dB set to a given value. In this example, the event is triggered when the Doppler shift measured on resource1 is lower than threshold-mps and the measured signal quality on resource1 is higher than threshold-dB.

Other examples of velocity-based mobility measurement and reporting can be envisioned based on the above examples or other teachings provided herein.

A velocity-based mobility event triggers a report by the UE 1006 in some embodiments, which may then be used by the network to transfer the UE to the NT-TRP 1004, using an L1-based mobility control command for example. Potential benefits of such a transition or transfer of the UE between a T-TRP network tier and an NT-TRP network tier are discussed by way of example elsewhere herein.

Figure 11A:
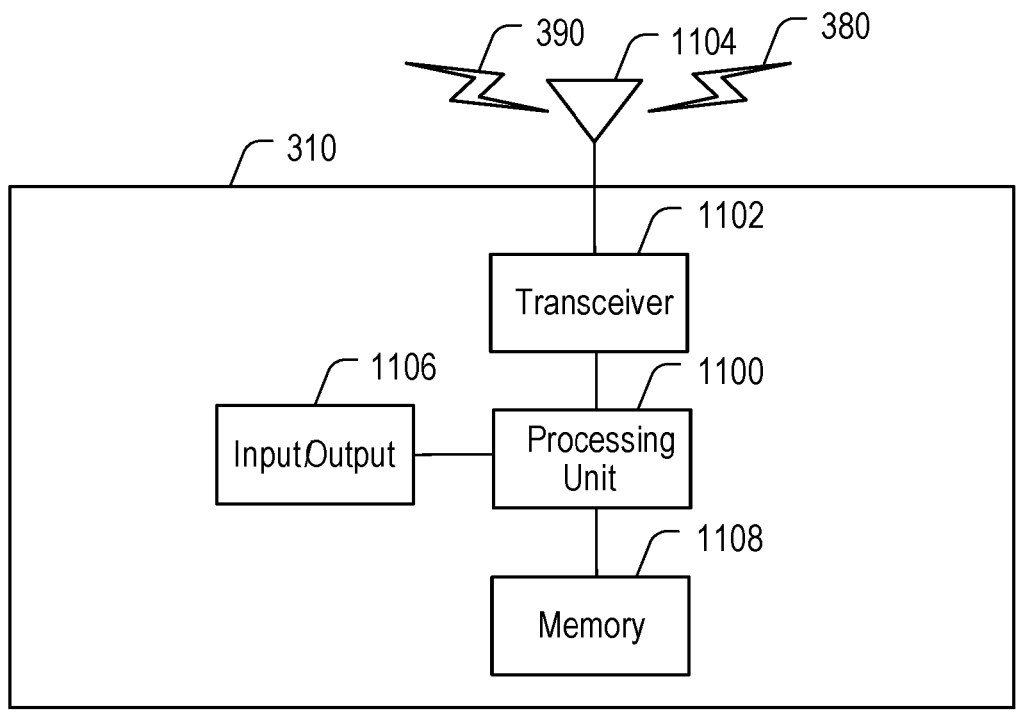
FIGS. 11A, 11B, and 11C are block diagrams illustrating example devices that may implement the methods and teachings according to this disclosure.
Figure 11B:
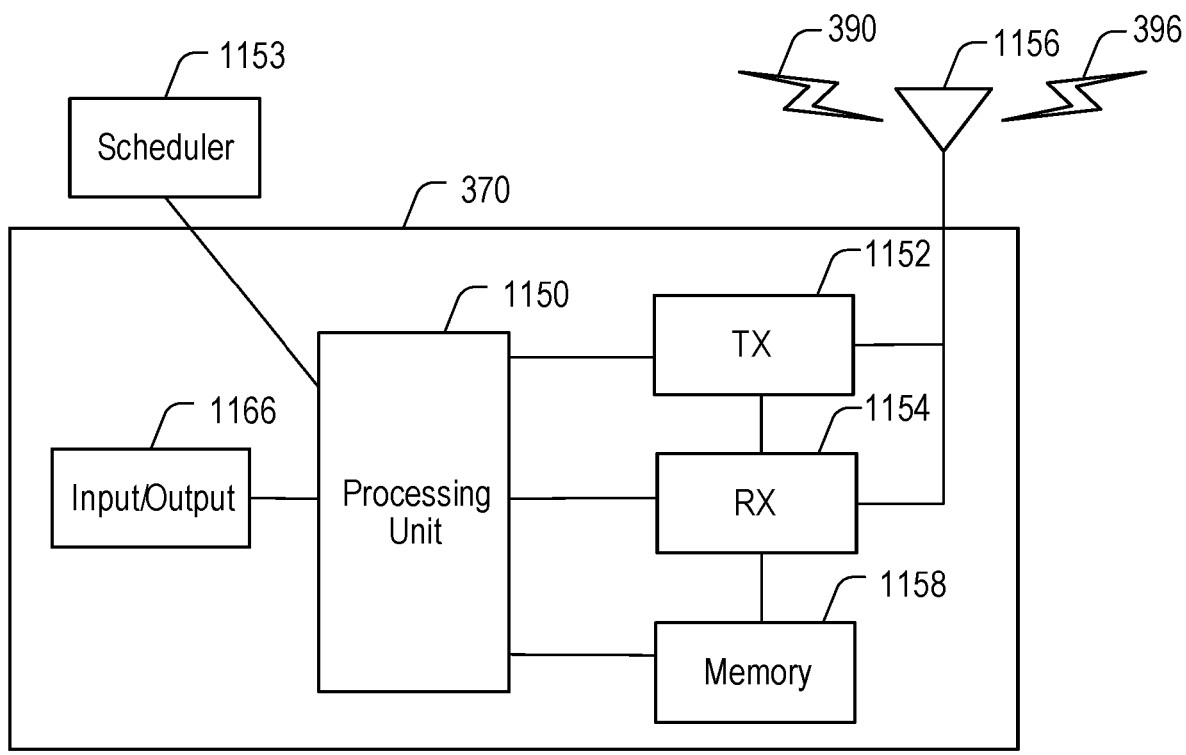
Figure 11C:
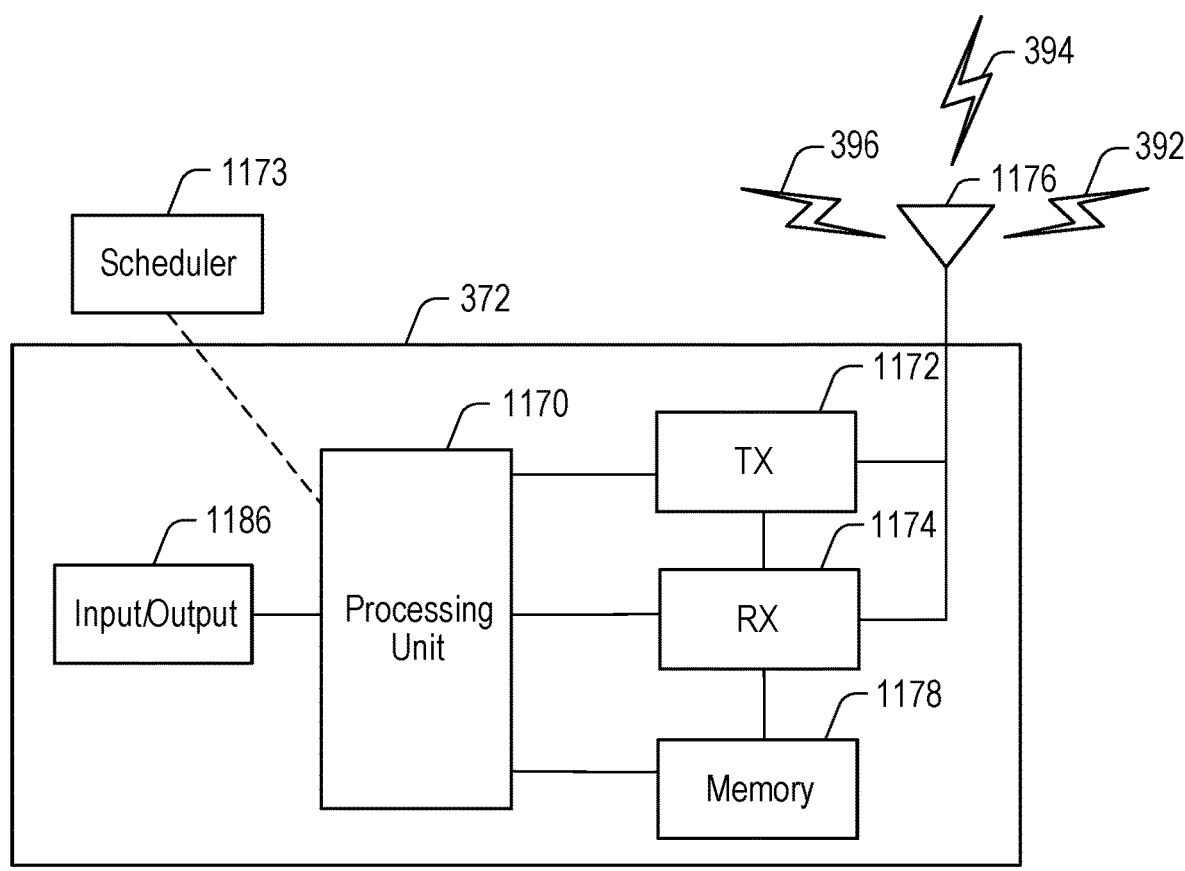

Embodiments are described by way of example above primarily in the context of methods or procedures. Other embodiments, such as apparatus embodiments, are also possible. FIGS. 11A, 11B, and 11C illustrate example devices that may implement features according to this disclosure.

In particular, with reference also to FIG. 3, FIG. 11A illustrates an example ED 310*a-d*, FIG. 11B illustrates an example terrestrial TRP 370*a-b*, and FIG. 3C illustrates an example non-terrestrial TRP 372*a-b*. These components could be used in the communication system 300 or in any other multi-tier wireless communication network.

As shown in FIG. 11A, the ED 310 includes at least one processor or processing unit 1100. The processing unit 1100 implements various processing operations of the ED 310. For example, the processing unit 1100 could perform signal coding, bit scrambling, data processing, power control, input/output processing, or any other functionality enabling the ED 310 to operate in a communication network or system. The processing unit 1100 may also be configured to implement some or all of the functionality and/or embodiments described in more detail herein. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The ED 310 also includes at least one transceiver 1102. The transceiver 1102 is configured to modulate data or other content for transmission by at least one antenna or Network Interface Controller (NIC) 1104. The transceiver 1102 is also configured to demodulate data or other content received by the at least one antenna 1104. The transceiver 1102 includes any suitable structure for generating signals for wireless transmission and/or processing signals received wirelessly. Each antenna 1104 includes any suitable structure for transmitting and/or receiving wireless signals. One or multiple transceivers 1102 could be used in the ED 310. One or multiple antennas 1104 could be used in the ED 310. Although shown as a single functional unit, a transceiver 1102 could also be implemented using at least one transmitter and at least one separate receiver.

The ED 310 further includes one or more input/output devices 1106 or interfaces. The input/output devices 1106 permit interaction with a user or other devices in the network. Each input/output device 1106 includes any suitable structure for providing information to or receiving information from a user, such as a speaker, microphone, keypad, keyboard, display, or touch screen, including network interface communications.

In addition, the ED 310 includes at least one memory 1108. The memory 1108 stores instructions and data used, generated, or collected by the ED 310. For example, the memory 1108 could store software instructions or modules configured to implement some or all of the functionality and/or embodiments described herein and that are executed by the processing unit(s) 1100. Each memory 1108 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the terrestrial TRP 370 includes at least one processing unit 1150, at least one transmitter 1152, at least one receiver 1154, one or more antennas 1156, at least one memory 1158, and one or more input/output devices or interfaces 1166. In some implementations, the terrestrial TRP 370 is a base station. A transceiver, not shown, may be used instead of the transmitter 1152 and receiver 1154. A scheduler 1153 may be coupled to the processing unit 1150. The scheduler 1153 may be included within or operated separately from the terrestrial TRP 370. The processing unit 1150 implements various processing operations of the terrestrial TRP 370, such as signal coding, bit scrambling, data processing, power control, input/output processing, or any other functionality. The processing unit 1150 can also be configured to implement some or all of the functionality and/or embodiments described in more detail elsewhere herein. Each processing unit 1150 includes any suitable processing or computing device configured to perform one or more operations. Each processing unit 1150 could, for example, include a microprocessor, microcontroller, digital signal processor, field programmable gate array, or application specific integrated circuit.

Each transmitter 1152 includes any suitable structure for generating signals for wireless transmission to one or more EDs or other devices. Each receiver 1154 includes any suitable structure for processing signals received wirelessly from one or more EDs or other devices. Although shown as separate components, at least one transmitter 1152 and at least one receiver 1154 could be combined into a transceiver. Each antenna 1156 includes any suitable structure for transmitting and/or receiving wireless signals via the wireless links 390, 396. Although a common antenna 1156 is shown here as being coupled to both the transmitter 1152 and the receiver 1154, one or more antennas 1156 could be coupled to the transmitter(s) 1152, and one or more separate antennas 1156 could be coupled to the receiver(s) 1154. Each memory 1158 includes any suitable volatile and/or non-volatile storage and retrieval device(s) such as those described above in connection to the ED 310. The memory 1158 stores instructions and data used, generated, or collected by the terrestrial TRP 370. For example, the memory 1158 could store software instructions or modules configured to implement some or all of the functionality and/or embodiments described above and that are executed by the processing unit(s) 1150.

Each input/output device 1166 permits interaction with a user or other devices in the network. Each input/output device 1166 includes any suitable structure for providing information to or receiving/providing information from a user, including network interface communications.

Referring now to FIG. 11C, the non-terrestrial TRP 372 includes at least one processing unit 1170, at least one transmitter 1172, at least one receiver 1174, one or more antennas 1176, at least one memory 1178, and one or more input/output devices or interfaces 1186. A transceiver, not shown, may be used instead of the transmitter 1172 and receiver 1174. An optional scheduler 1173 may be coupled to the processing unit 1170. The scheduler 1173 may be included within or operated separately from the non-terrestrial TRP 372. The processing unit 1170 implements various processing operations of the non-terrestrial TRP 372, such as signal coding, bit scrambling, data processing, power control, input/output processing, or any other functionality. The processing unit 1170 can also be configured to implement some or all of the functionality and/or embodiments described in more detail elsewhere herein. Each processing unit 1170 includes any suitable processing or computing device configured to perform one or more operations. Each processing unit 1170 could, for example, include a microprocessor, microcontroller, digital signal processor, field programmable gate array, or application specific integrated circuit.

Each transmitter 1172 includes any suitable structure for generating signals for wireless transmission to one or more EDs or other devices. Each receiver 1174 includes any suitable structure for processing signals received wirelessly from one or more EDs or other devices. Although shown as separate components, at least one transmitter 1172 and at least one receiver 1174 could be combined into a transceiver. Each antenna 1176 includes any suitable structure for transmitting and/or receiving wireless signals via the wireless links 392, 394, 396. Although a common antenna 1176 is shown here as being coupled to both the transmitter 1172 and the receiver 1174, one or more antennas 1176 could be coupled to the transmitter(s) 1172, and one or more separate antennas 1176 could be coupled to the receiver(s) 1174. Each memory 1178 includes any suitable volatile and/or non-volatile storage and retrieval device(s) such as those described above in connection to the ED 310. The memory 1178 stores instructions and data used, generated, or collected by the non-terrestrial TRP 372. For example, the memory 1178 could store software instructions or modules configured to implement some or all of the functionality and/or embodiments described above and that are executed by the processing unit(s) 1170.

Each input/output device 1186 permits interaction with a user or other devices in the network. Each input/output device 1186 includes any suitable structure for providing information to or receiving/providing information from a user, including network interface communications.

It should be appreciated that one or more embodiments disclosed herein, including method embodiments or apparatus embodiments, may be implemented by corresponding units or modules. For example, a signal may be transmitted by a transmitting unit or a transmitting module. A signal may be received by a receiving unit or a receiving module. A signal may be processed by a processing unit or a processing module. Other features may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. For example, any of the memory 1108, the memory 1158, and the memory 1178 could include one or more physical memory devices. Solid-state memory devices such as a Flash memory device could be implemented. Memory devices with movable or even removable storage media could also or instead be implemented.

FIG. 11A illustrates an example of a UE, and FIGS. 11B and 11C illustrate examples network devices, in which embodiments could be implemented. More generally, an apparatus may include a processor and a non-transitory computer readable storage medium, such as the processing unit 1100, 1150, 1170 and memory 1108, 1158, 1178. Such an apparatus may be a UE. Another example of an apparatus is network equipment, which may be a gNB, a TRP, a base station, or any other type of network device or equipment referenced herein. Other components, such as a communication interface to which the processor is coupled, may also be provided. Elements 1102, 1104, 1152, 1154, 1156, 1172, 1174, 1176 are examples of communication interfaces that may be provided in some embodiments.

In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

In some embodiments, the programming includes instructions to, or to cause a processor to, communicate, in a multi-tier wireless communication network that includes network devices distributed among multiple tiers, signaling that includes tier activation information for controlling activation of a UE for operation with a network device of a first tier and a network device of a second tier. The multiple tiers of the multi-tier wireless communication network include a terrestrial tier and a non-terrestrial tier.

Some embodiments include any one or more of the following features, in any of various combinations:
controlling activation involves one or both of: activating the UE for operation with the network device of the second tier; and deactivating the UE for operation with the network device of the first tier;
the tier activation information is or includes one or both of: a command for activating the UE for operation with the network device of the second tier; and a command for deactivating the UE for operation with the network device of the first tier;
the tier activation information is or includes a command for activating the UE for operation with the network device of the second tier and deactivating the UE for operation with the network device of the first tier;
controlling activation involves changing operation of the UE between operation with the network device of the first tier and operation with the network device of the second tier;
operation of the UE with the network device of the first tier involves detecting, measuring and reporting associated with reference signals for mobility received from the network device of the first tier;
operation of the UE with the network device of the second tier involves detecting, measuring and reporting associated with reference signals for mobility received from the network device of the second tier;
operation of the UE with the network device of the first tier involves communicating one or both of control and data with the network device of the first tier;
operation of the UE with the network device of the second tier involves communicating one or both of control and data with the network device of the second tier;
the programming further includes instructions to, or to cause the processor to, determine whether activation of the UE for operation with the network device of the first tier or the network device of the second tier is to be changed;
the instructions to communicate signaling include instructions to, or to cause the processor to, transmit the signaling to the UE responsive to determining that activation of the UE for operation with the network device of the first tier or the network device of the second tier is to be changed;
the instructions to determine include instructions to, or to cause the processor to, determine whether activation of the UE for operation with the network device of the first tier or the network device of the second tier is to be changed based on one or more of the following criteria: velocity of the UE relative to one or more network devices of the first tier; velocity of the UE relative to one or more network devices of the second tier; Doppler shift associated with one or more network devices of the first tier; Doppler shift associated with one or more network devices of the second tier; loading of one or more network devices of the first tier; loading of one or more network devices of the second tier;
the instructions to communicate signaling include instructions to, or to cause the processor to, receive the signaling at the UE;
the programming further includes instructions to, or to cause the processor to, perform any one or more of: activating the UE for operation with the network device of the second tier responsive to receiving the signaling; deactivating the UE for operation with the network device of the first tier responsive to receiving the signaling; changing operation of the UE between operation with the network device of the first tier and operation with the network device of the second tier responsive to receiving the signaling;
the tier activation information is or includes information that is indicative of one or more communication resources, the one or more communication resources including a communication resource that is to be monitored by the UE, a communication resource that is not to be monitored by the UE, or both a communication resource that is to be monitored by the UE and a communication resource that is not to be monitored by the UE;
the signaling is or includes information that is indicative of one or both of the first tier and the second tier;
the signaling is or includes MCI;
the signaling is or includes DCI;
the signaling is or includes MAC signaling.

Other features that could be implemented in apparatus embodiments or in non-transitory computer readable storage medium embodiments could be or become apparent, for example, from the method embodiments disclosed herein.

Features disclosed in the context of any embodiment are not necessarily exclusive to that particular embodiment, and may also or instead be applied to other embodiments.

The present disclosure encompasses several aspects of mobility management, including activation and deactivation of mobility measurements, mobility control signaling such as L1-based signaling for control of mobility measurements, and velocity-based mobility events.

Potential benefits or advantages of mobility management as disclosed herein may include, for example integrated mobility between fixed network devices such as fixed T-TRPs and moving network devices such as mobile NT-TRPs. UEs may conserve limited resources by monitoring radio link quality from mobility resources based on network activation and deactivation commands. MCI messages, for example, may allow the network to dynamically activate and deactivate mobility measurements and offload UEs from or to T-TRPs. Velocity-based mobility event monitoring and reporting by a UE may allow the network to send offloading commands to transition or transfer UEs to and from NT-TRPs based on UE movement. In some embodiments, variations in Doppler shift reported by a UE allow the network to indicate to the UE the signals that are to be used by the UE for detection and measurement of physical-layer channels.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

In some embodiments, UEs may support a feature of activation/deactivation of mobility measurements without explicitly indicating capability signaling. For example, UEs may be required or presumed to support activation/deactivation of mobility measurements in a mandatory manner. In other embodiments, UEs may support activation/deactivation of mobility measurements by indicating capability signaling, which may be useful to enable implementations that include UEs that may support activation/deactivation of mobility measurements in a mandatory manner or an optional manner.

In some embodiments, a UE may report the maximum number of mobility reference signals that can be actively monitored, by detection and measurement, at a given time. It is then up to network implementation to ensure proper configuration of mobility reference signal sets and have restrictions in place to transmit activation commands and/or deactivation commands that activate mobility reference signal monitoring and/or deactivate mobility reference signal monitoring such that the number of activated mobility reference signals is below the maximum number indicated by the UE.

Similarly, in some embodiments, a UE may report the maximum number of mobility reference signal sets that can be activated at a given time, and it is then up to network implementation to ensure proper configuration of mobility reference signal sets and transmit activation commands and/or deactivation commands that activate and/or deactivate mobility reference signal sets such that the number of activated mobility reference signal sets is below the maximum number indicated by the UE.

In some embodiments, a UE may report the maximum number of network tiers that the UE can be configured with at a given time. It is then up to network implementation to ensure proper configuration of network tiers and proper allocation and/or deactivation of mobility reference signals within each tier and have restrictions in place such that the number of network tiers configured at the UE is below the maximum number indicated by the UE.

In some embodiments, a UE may report the maximum number of velocity-based mobility events that the UE can be configured with at a given time. It is then up to network implementation to ensure proper configuration of velocity-based mobility events and have restrictions in place such that the number of velocity-based mobility events configured at the UE is below the maximum number indicated by the UE.

The present disclosure encompasses various embodiments, including the following illustrative examples.

An example 1 relates to a method in a multi-tier wireless communication network that comprises a plurality of network devices distributed among a plurality of tiers, the plurality of tiers comprising a terrestrial tier and a non-terrestrial tier, the method comprising: communicating signaling that comprises tier activation information for controlling activation of a User Equipment (UE) for operation with a network device of a first tier of the plurality of tiers and a network device of a second tier of the plurality of tiers.

An example 2 relates to the method of example 1, wherein controlling activation comprises one or both of: activating the UE for operation with the network device of the second tier; and deactivating the UE for operation with the network device of the first tier.

An example 3 relates to the method of example 2, wherein the tier activation information comprises one or both of: a command for activating the UE for operation with the network device of the second tier; and a command for deactivating the UE for operation with the network device of the first tier.

An example 4 relates to the method of example 2, wherein the tier activation information comprises a command for activating the UE for operation with the network device of the second tier and deactivating the UE for operation with the network device of the first tier.

An example 5 relates to the method of example 1, wherein controlling activation comprises changing operation of the UE between operation with the network device of the first tier and operation with the network device of the second tier.

An example 6 relates to the method of any one of examples 1 to 5, wherein operation of the UE with the network device of the first tier comprises detecting, measuring and reporting associated with reference signals for mobility received from the network device of the first tier, and operation of the UE with the network device of the second tier comprises detecting, measuring and reporting associated with reference signals for mobility received from the network device of the second tier.

An example 7 relates to the method of any one of examples 1 to 6, wherein operation of the UE with the network device of the first tier comprises communicating one or both of control and data with the network device of the first tier, and operation of the UE with the network device of the second tier comprises communicating one or both of control and data with the network device of the second tier.

An example 8 relates to the method of any one of examples 1 to 7, further comprising: determining whether activation of the UE for operation with the network device of the first tier or the network device of the second tier is to be changed, wherein the communicating comprises transmitting the signaling to the UE responsive to determining that activation of the UE for operation with the network device of the first tier or the network device of the second tier is to be changed.

An example 9 relates to the method of example 8, wherein the determining comprises determining based on one or more of the following criteria: velocity of the UE relative to one or more network devices of the first tier; velocity of the UE relative to one or more network devices of the second tier; Doppler shift associated with one or more network devices of the first tier; Doppler shift associated with one or more network devices of the second tier; loading of one or more network devices of the first tier; loading of one or more network devices of the second tier.

An example 10 relates to the method of any one of examples 1 to 9, wherein the communicating comprises the UE receiving the signaling, the method further comprising one or more of: activating the UE for operation with the network device of the second tier responsive to receiving the signaling; deactivating the UE for operation with the network device of the first tier responsive to receiving the signaling; changing operation of the UE between operation with the network device of the first tier and operation with the network device of the second tier responsive to receiving the signaling.

An example 11 relates to the method of any one of examples 1 to 10, wherein the tier activation information comprises information that is indicative of one or more communication resources, the one or more communication resources comprising a communication resource that is to be monitored by the UE, a communication resource that is not to be monitored by the UE, or both a communication resource that is to be monitored by the UE and a communication resource that is not to be monitored by the UE.

An example 12 relates to the method of any one of examples 1 to 11, wherein the tier activation information comprises information that is indicative of one or both of the first tier and the second tier.

An example 13 relates to the method of any one of examples 1 to 12, wherein the signaling comprises Mobility Control Information (MCI).

An example 14 relates to the method of any one of examples 1 to 13, wherein the signaling comprises Downlink Control Information (DCI).

An example 15 relates to the method of any one of examples 1 to 13, wherein the signaling comprises Medium Access Control (MAC) signaling.

An example 16 relates to an apparatus comprising: a communication interface; a processor, coupled to the communication interface; a non-transitory computer readable storage medium, coupled to the processor, storing programming for execution by the processor, the programming including instructions to, in a multi-tier wireless communication network that comprises a plurality of network devices distributed among a plurality of tiers, the plurality of tiers comprising a terrestrial tier and a non-terrestrial tier: communicate signaling that comprises tier activation information for controlling activation of a User Equipment (UE) for operation with a network device of a first tier of the plurality of tiers and a network device of a second tier of the plurality of tiers.

An example 17 relates to the apparatus of example 16, wherein controlling activation comprises one or both of: activating the UE for operation with the network device of the second tier; and deactivating the UE for operation with the network device of the first tier.

An example 18 relates to the apparatus of example 17, wherein the tier activation information comprises one or both of: a command for activating the UE for operation with the network device of the second tier; and a command for deactivating the UE for operation with the network device of the first tier.

An example 19 relates to the apparatus of example 17, wherein the tier activation information comprises a command for activating the UE for operation with the network device of the second tier and deactivating the UE for operation with the network device of the first tier.

An example 20 relates to the apparatus of example 16, wherein controlling activation comprises changing operation of the UE between operation with the network device of the first tier and operation with the network device of the second tier.

An example 21 relates to the apparatus of any one of examples 16 to 20, wherein operation of the UE with the network device of the first tier comprises detecting, measuring and reporting associated with reference signals for mobility received from the network device of the first tier, and operation of the UE with the network device of the second tier comprises detecting, measuring and reporting associated with reference signals for mobility received from the network device of the second tier.

An example 22 relates to the apparatus of any one of examples 16 to 21, wherein operation of the UE with the network device of the first tier comprises communicating one or both of control and data with the network device of the first tier, and operation of the UE with the network device of the second tier comprises communicating one or both of control and data with the network device of the second tier.

An example 23 relates to the apparatus of any one of examples 16 to 22, the programming further including instructions to: determine whether activation of the UE for operation with the network device of the first tier or the network device of the second tier is to be changed, wherein the instructions to communicate signaling comprise instructions to transmit the signaling to the UE responsive to determining that activation of the UE for operation with the network device of the first tier or the network device of the second tier is to be changed.

An example 24 relates to the apparatus of example 23, wherein the instructions to determine comprise instructions to determine whether activation of the UE for operation with the network device of the first tier or the network device of the second tier is to be changed based on one or more of the following criteria: velocity of the UE relative to one or more network devices of the first tier; velocity of the UE relative to one or more network devices of the second tier; Doppler shift associated with one or more network devices of the first tier; Doppler shift associated with one or more network devices of the second tier; loading of one or more network devices of the first tier; loading of one or more network devices of the second tier.

An example 25 relates to the apparatus of any one of examples 16 to 24, wherein the instructions to communicate signaling comprise instructions to receive the signaling at the UE, the programming further including instructions to perform any one or more of: activating the UE for operation with the network device of the second tier responsive to receiving the signaling; deactivating the UE for operation with the network device of the first tier responsive to receiving the signaling; changing operation of the UE between operation with the network device of the first tier and operation with the network device of the second tier responsive to receiving the signaling.

An example 26 relates to the apparatus of any one of examples 16 to 25, wherein the tier activation information comprises information that is indicative of one or more communication resources, the one or more communication resources comprising a communication resource that is to be monitored by the UE, a communication resource that is not to be monitored by the UE, or both a communication resource that is to be monitored by the UE and a communication resource that is not to be monitored by the UE.

An example 27 relates to the apparatus of any one of examples 16 to 26, wherein the tier activation information comprises information that is indicative of one or both of the first tier and the second tier.

An example 28 relates to the apparatus of any one of examples 16 to 27, wherein the signaling comprises MCI.

An example 29 relates to the apparatus of any one of examples 16 to 28, wherein the signaling comprises DCI.

An example 30 relates to the apparatus of any one of examples 16 to 29, wherein the signaling comprises MAC signaling.

An example 31 relates to a computer program product comprising a non-transitory computer readable storage medium storing programming, the programming including instructions to, in a multi-tier wireless communication network that comprises a plurality of network devices distributed among a plurality of tiers, the plurality of tiers comprising a terrestrial tier and a non-terrestrial tier: communicate signaling that comprises tier activation information for controlling activation of a UE for operation with a network device of a first tier of the plurality of tiers and a network device of a second tier of the plurality of tiers.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-Ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method in a multi-tier wireless communication network that comprises a plurality of network devices distributed among a plurality of tiers, the plurality of tiers comprising a terrestrial tier and a non-terrestrial tier, the method comprising:
communicating signaling that comprises tier activation information, the tier activation information comprising information that is indicative of a tier of the plurality of tiers, for controlling activation of a user equipment (UE) for operation with a network device of a first tier of the plurality of tiers or a network device of a second tier of the plurality of tiers.

2. The method of claim 1,
wherein the information that is indicative of a tier comprises information that is indicative of one or both of the first tier from which the UE is to be deactivated or the second tier to which the UE is to be activated; and
wherein the controlling activation comprises one or both of activating the UE for operation with the network device of the second tier or deactivating the UE for operation with the network device of the first tier.

3. The method of claim 1,
wherein the operation of the UE with the network device of the first tier comprises detecting, measuring and reporting associated with reference signals for mobility received from the network device of the first tier, and wherein operation of the UE with the network device of the second tier comprises detecting, measuring and reporting associated with reference signals for mobility received from the network device of the second tier; and wherein the tier activation information further comprises an indication as to whether the tier activation information is activating or deactivating measurements on resources defined in the tier indicated by the information that is indicative of a tier.

4. The method of claim 1, further comprising:
determining whether activation of the UE for operation with the network device of the first tier or the network device of the second tier is to be changed,
wherein the communicating comprises transmitting the signaling to the UE responsive to determining that activation of the UE for operation with the network device of the first tier or the network device of the second tier is to be changed.

5. The method of claim 4, wherein the determining comprises determining based on one or more of the following criteria:
velocity of the UE relative to one or more network devices of the first tier;
velocity of the UE relative to one or more network devices of the second tier;
Doppler shift associated with one or more network devices of the first tier;
Doppler shift associated with one or more network devices of the second tier;
loading of one or more network devices of the first tier;
loading of one or more network devices of the second tier.

6. The method of claim 1, wherein the communicating comprises the UE receiving the signaling, the method further comprising one or more of:
activating the UE for operation with the network device of the second tier responsive to receiving the signaling;
deactivating the UE for operation with the network device of the first tier responsive to receiving the signaling; or
changing operation of the UE between operation with the network device of the first tier and operation with the network device of the second tier responsive to receiving the signaling.

7. The method of claim 1, wherein the signaling comprises at least one of mobility control information (MCI), downlink control information (DCI) or medium access control (MAC) signaling.

8. An apparatus comprising:
a communication interface;
a processor, coupled to the communication interface;
a non-transitory computer readable storage medium, coupled to the processor, storing programming for execution by the processor, the programming including instructions to, in a multi-tier wireless communication network that comprises a plurality of network devices distributed among a plurality of tiers, the plurality of tiers comprising a terrestrial tier and a non-terrestrial tier:
communicate signaling that comprises tier activation information, the tier activation information comprising information that is indicative of a tier of the plurality of tiers, for controlling activation of a user equipment (UE) for operation with a network device of a first tier of the plurality of tiers or a network device of a second tier of the plurality of tiers.

9. The apparatus of claim 8,
wherein the information that is indicative of a tier comprises information that is indicative of one or both of the first tier from which the UE is to be deactivated or the second tier to which the UE is to be activated; and
wherein the controlling activation comprises one or both of activating the UE for operation with the network device of the second tier or deactivating the UE for operation with the network device of the first tier.

10. The apparatus of claim 8,
wherein the operation of the UE with the network device of the first tier comprises detecting, measuring and reporting associated with reference signals for mobility received from the network device of the first tier, and operation of the UE with the network device of the second tier comprises detecting, measuring and reporting associated with reference signals for mobility received from the network device of the second tier; and
wherein the tier activation information further comprises an indication as to whether the tier activation information is activating or deactivating measurements on resources defined in the tier indicated by the information that is indicative of a tier.

11. The apparatus of claim 8, the programming further including instructions to:
determine whether activation of the UE for operation with the network device of the first tier or the network device of the second tier is to be changed,
wherein the instructions to communicate signaling comprise instructions to transmit the signaling to the UE responsive to determining that activation of the UE for operation with the network device of the first tier or the network device of the second tier is to be changed.

12. The apparatus of claim 11, wherein the instructions to determine comprise instructions to determine whether activation of the UE for operation with the network device of the first tier or the network device of the second tier is to be changed based on one or more of the following criteria:
velocity of the UE relative to one or more network devices of the first tier;
velocity of the UE relative to one or more network devices of the second tier;
Doppler shift associated with one or more network devices of the first tier;
Doppler shift associated with one or more network devices of the second tier;
loading of one or more network devices of the first tier;
loading of one or more network devices of the second tier.

13. The apparatus of claim 8, wherein the instructions to communicate signaling comprise instructions to receive the signaling at the UE, the programming further including instructions to perform any one or more of:
activating the UE for operation with the network device of the second tier responsive to receiving the signaling;
deactivating the UE for operation with the network device of the first tier responsive to receiving the signaling; or
changing operation of the UE between operation with the network device of the first tier and operation with the network device of the second tier responsive to receiving the signaling.

14. The apparatus of claim 8, wherein the signaling comprises at least one of mobility control information (MCI), downlink control information (DCI), or medium access control (MAC) signaling.

15. A non-transitory computer readable storage medium storing programming, the programming including instructions to, in a multi-tier wireless communication network that comprises a plurality of network devices distributed among a plurality of tiers, the plurality of tiers comprising a terrestrial tier and a non-terrestrial tier:
communicate signaling that comprises tier activation information, the tier activation information comprising information that is indicative of a tier of the plurality of tiers, for controlling activation of a user equipment (UE) for operation with a network device of a first tier of the plurality of tiers or a network device of a second tier of the plurality of tiers.

16. The medium of claim 15,
wherein the information that is indicative of a tier comprises information that is indicative of one or both of the first tier from which the UE is to be deactivated or the second tier to which the UE is to be activated; and
wherein the controlling activation comprises one or both of activating the UE for operation with the network device of the second tier or deactivating the UE for operation with the network device of the first tier.

17. The medium of claim 15,
wherein the operation of the UE with the network device of the first tier comprises detecting, measuring and reporting associated with reference signals for mobility received from the network device of the first tier, and operation of the UE with the network device of the second tier comprises detecting, measuring and reporting associated with reference signals for mobility received from the network device of the second tier; and
wherein the tier activation information further comprises an indication as to whether the tier activation information is activating or deactivating measurements on resources defined in the tier indicated by the information that is indicative of a tier.

18. The medium of claim 15, the programming including instructions further to:
determine whether activation of the UE for operation with the network device of the first tier or the network device of the second tier is to be changed,
wherein the communicating comprises transmitting the signaling to the UE responsive to determining that activation of the UE for operation with the network device of the first tier or the network device of the second tier is to be changed.

19. The medium of claim 18, wherein the determine comprises determine based on one or more of the following criteria:
velocity of the UE relative to one or more network devices of the first tier;
velocity of the UE relative to one or more network devices of the second tier;
Doppler shift associated with one or more network devices of the first tier;
Doppler shift associated with one or more network devices of the second tier;
loading of one or more network devices of the first tier;
loading of one or more network devices of the second tier.

20. The medium of claim 15, wherein the communicate comprises the UE receiving the signaling, the programming including instructions further to perform one or more of:
activate the UE for operation with the network device of the second tier responsive to receiving the signaling;
deactivate the UE for operation with the network device of the first tier responsive to receiving the signaling; or
change operation of the UE between operation with the network device of the first tier and operation with the network device of the second tier responsive to receiving the signaling.

* * * * *